(12) United States Patent  
Crosby et al.

(10) Patent No.: US 10,100,229 B2
(45) Date of Patent: *Oct. 16, 2018

(54) DOUBLE- AND MULTI-SIDED ADHESIVE DEVICES

(71) Applicant: University of Massachusetts, Boston, MA (US)

(72) Inventors: Alfred J. Crosby, Amherst, MA (US); Michael D. Bartlett, Amherst, MA (US)

(73) Assignee: University of Massachusetts, Boston, MA (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/156,546

(22) Filed: May 17, 2016

(65) Prior Publication Data

US 2016/0333228 A1 Nov. 17, 2016

Related U.S. Application Data

(63) Continuation of application No. 14/372,512, filed as application No. PCT/US2013/021846 on Jan. 17, 2013, now Pat. No. 9,395,038.

(Continued)

(51) Int. Cl.
*F16B 47/00* (2006.01)
*A47G 1/17* (2006.01)

(Continued)

(52) U.S. Cl.
CPC ............ *C09J 7/045* (2013.01); *A47G 1/1606* (2013.01); *A47G 1/175* (2013.01); *B32B 3/06* (2013.01);

(Continued)

(58) Field of Classification Search
CPC .......... A47G 1/168; A47G 1/17; A47G 1/175; F16B 11/006; F16B 47/003; C09J 7/20;

(Continued)

(56) References Cited

U.S. PATENT DOCUMENTS 1,739,296 A 12/1929 Du Pont
2,884,342 A 4/1959 Wolff (Continued)

FOREIGN PATENT DOCUMENTS

CN 1284983 A 2/2001
CN 1508204 A 6/2004

(Continued)

OTHER PUBLICATIONS

Extended European Search Report dated Aug. 11, 2015 in connection with Application No. 13738720.5.

(Continued)

*Primary Examiner* — Carson Gross
(74) *Attorney, Agent, or Firm* — Wolf, Greenfield & Sacks, P.C.

(57) ABSTRACT

The invention provides unique releasable adhesive devices and related methods that are capable of simultaneously adhering to two or multiple target surfaces of various nature and allow high load capacity, are reusable, easy release and suitable for extended and repeated use.

27 Claims, 18 Drawing Sheets

Related U.S. Application Data

(60) Provisional application No. 61/588,241, filed on Jan. 19, 2012.

(51) Int. Cl.

| | | |
|---|---|---|
| *C09J 7/04* | (2006.01) | |
| *B32B 5/26* | (2006.01) | |
| *B32B 3/06* | (2006.01) | |
| *B32B 37/24* | (2006.01) | |
| *F16M 13/02* | (2006.01) | |
| *B32B 7/12* | (2006.01) | |
| *B32B 27/12* | (2006.01) | |
| *B32B 27/28* | (2006.01) | |
| *B32B 27/32* | (2006.01) | |
| *B32B 27/40* | (2006.01) | |
| *A47G 1/16* | (2006.01) | |
| *C09J 7/00* | (2018.01) | |
| *C09J 7/38* | (2018.01) | |
| *C09J 7/21* | (2018.01) | |
| *F16B 11/00* | (2006.01) | |

(52) U.S. Cl.
CPC ............... *B32B 5/26* (2013.01); *B32B 7/12* (2013.01); *B32B 27/12* (2013.01); *B32B 27/283* (2013.01); *B32B 27/322* (2013.01); *B32B 27/40* (2013.01); *B32B 37/24* (2013.01); *C09J 7/00* (2013.01); *C09J 7/21* (2018.01); *C09J 7/38* (2018.01); *F16M 13/02* (2013.01); *F16M 13/022* (2013.01); *A47G 1/17* (2013.01); *B32B 2260/021* (2013.01); *B32B 2260/046* (2013.01); *B32B 2262/0261* (2013.01); *B32B 2262/0269* (2013.01); *B32B 2262/0276* (2013.01); *B32B 2262/0292* (2013.01); *B32B 2262/101* (2013.01); *B32B 2262/105* (2013.01); *B32B 2262/106* (2013.01); *B32B 2307/51* (2013.01); *B32B 2405/00* (2013.01); *C09J 2201/28* (2013.01); *C09J 2201/622* (2013.01); *C09J 2201/626* (2013.01); *C09J 2400/263* (2013.01); *C09J 2433/00* (2013.01); *C09J 2453/00* (2013.01); *C09J 2475/00* (2013.01); *C09J 2483/00* (2013.01); *F16B 11/006* (2013.01); *Y10T 156/10* (2015.01)

(58) Field of Classification Search
CPC .. C09J 7/21; C09J 2201/606; C09J 2201/618; C09J 2201/626
USPC .......................................... 156/297, 298, 299
See application file for complete search history.

(56) References Cited

U.S. PATENT DOCUMENTS

| | | | |
|---|---|---|---|
| 3,653,381 A | 4/1972 | Warnken | |
| 3,691,140 A | 9/1972 | Silver | |
| 4,357,198 A | 11/1982 | Ezquerro | |
| 4,851,076 A | 7/1989 | Manusch et al. | |
| 4,915,768 A | 4/1990 | Soderberg | |
| 4,926,526 A | 5/1990 | Brown et al. | |
| 4,967,740 A | 11/1990 | Riedel | |
| 5,049,416 A * | 9/1991 | Wilczynski | C09J 133/062 427/208.4 |
| 5,269,871 A | 12/1993 | Longwoth et al. | |
| 5,399,219 A | 3/1995 | Roessler et al. | |
| 5,516,581 A | 5/1996 | Kreckel et al. | |
| 5,722,127 A | 3/1998 | Coates | |
| 5,747,131 A | 5/1998 | Kreckel | |
| 5,865,945 A | 2/1999 | McConaughy | |
| 6,045,642 A | 4/2000 | Takeuchi et al. | |
| 6,120,867 A * | 9/2000 | Hamerski | A47G 1/175 428/121 |
| 6,302,177 B1 | 10/2001 | Gruber | |
| 6,403,206 B1 | 6/2002 | Bries et al. | |
| 6,558,789 B1 | 5/2003 | Hamerski et al. | |
| 6,569,521 B1 | 5/2003 | Sheridan et al. | |
| 6,572,945 B2 | 6/2003 | Bries et al. | |
| 6,701,580 B1 | 3/2004 | Bandyopadhyay | |
| 6,737,160 B1 | 5/2004 | Full et al. | |
| 6,872,439 B2 | 3/2005 | Fearing et al. | |
| 6,913,075 B1 | 7/2005 | Knowles et al. | |
| 7,011,723 B2 | 3/2006 | Full et al. | |
| 7,056,409 B2 | 6/2006 | Dubrow | |
| 7,066,182 B1 | 6/2006 | Dunshee | |
| 7,132,161 B2 | 11/2006 | Knowles et al. | |
| 7,144,624 B2 | 12/2006 | Knowles et al. | |
| 7,175,723 B2 | 2/2007 | Jones et al. | |
| 7,181,811 B1 | 2/2007 | Tomanek et al. | |
| 7,229,685 B2 | 6/2007 | Full et al. | |
| 7,762,362 B2 | 7/2010 | Cutkosky et al. | |
| 7,780,810 B2 | 8/2010 | Hamano | |
| 8,108,974 B2 | 2/2012 | Graf | |
| 8,557,378 B2 | 10/2013 | Yamanaka et al. | |
| 9,182,075 B2 | 11/2015 | Crosby et al. | |
| 9,395,038 B2 * | 7/2016 | Crosby | B32B 5/26 |
| 9,440,416 B2 * | 9/2016 | Crosby | B32B 7/02 |
| 9,574,113 B2 | 2/2017 | Crosby et al. | |
| 9,603,419 B2 | 3/2017 | Crosby et al. | |
| 2002/0095130 A1 | 7/2002 | Seitter et al. | |
| 2003/0038408 A1 | 2/2003 | Schulte | |
| 2003/0124312 A1 | 7/2003 | Autumn | |
| 2003/0134112 A1 | 7/2003 | Kreckel et al. | |
| 2003/0232190 A1 | 12/2003 | O'Leary et al. | |
| 2004/0009353 A1 | 1/2004 | Knowles et al. | |
| 2004/0046094 A1 | 3/2004 | Lan | |
| 2004/0076822 A1 | 4/2004 | Jagota et al. | |
| 2005/0119640 A1 | 6/2005 | Sverduk et al. | |
| 2005/0148984 A1 | 7/2005 | Lindsay et al. | |
| 2005/0158567 A1 | 7/2005 | Carper et al. | |
| 2005/0181170 A1 | 8/2005 | Fearing et al. | |
| 2006/0078725 A1 | 4/2006 | Fearing et al. | |
| 2006/0202355 A1 | 9/2006 | Majidi et al. | |
| 2007/0232974 A1 | 10/2007 | Serola | |
| 2007/0289786 A1 | 12/2007 | Cutkosky et al. | |
| 2008/0025822 A1 | 1/2008 | Kim et al. | |
| 2008/0164080 A1 | 7/2008 | Asbeck et al. | |
| 2009/0106951 A1 | 4/2009 | Edwards et al. | |
| 2010/0038502 A1 | 2/2010 | Lan | |
| 2010/0044491 A1 | 2/2010 | Ritchey et al. | |
| 2010/0136281 A1 | 6/2010 | Sitti et al. | |
| 2010/0175836 A1 | 7/2010 | Lam | |
| 2010/0221496 A1 | 9/2010 | de Jong | |
| 2012/0204383 A1 | 8/2012 | Wood et al. | |
| 2012/0216949 A1 | 8/2012 | Carey Stachowski et al. | |
| 2013/0273333 A1 | 10/2013 | Meier et al. | |
| 2014/0030490 A1 | 1/2014 | Crosby et al. | |
| 2014/0304953 A1 | 10/2014 | Crosby et al. | |
| 2014/0305569 A1 | 10/2014 | Crosby et al. | |
| 2014/0312188 A1 | 10/2014 | Crosby et al. | |
| 2014/0352881 A1 | 12/2014 | Crosby et al. | |
| 2016/0102804 A1 | 4/2016 | Crosby et al. | |
| 2016/0375654 A1 | 12/2016 | Crosby et al. | |
| 2017/0238660 A1 | 8/2017 | Crosby et al. | |

FOREIGN PATENT DOCUMENTS

| | | |
|---|---|---|
| CN | 1985288 A | 6/2007 |
| CN | 101528169 A | 9/2009 |
| CN | 2013-56127 A | 12/2009 |
| DE | 4339604 A1 | 5/1995 |
| DE | 20-2010-014239 U1 | 12/2010 |
| EP | 1 710 286 A1 | 10/2006 |
| EP | 1710287 A2 | 10/2006 |
| EP | 2522498 A1 | 11/2012 |
| JP | S48-084865 U1 | 1/1972 |
| JP | 55-52721 A | 4/1980 |
| JP | H05-052329 U | 7/1993 |
| JP | 2001-104118 A | 4/2001 |
| JP | 2002-501107 A | 1/2002 |

(56) References Cited

FOREIGN PATENT DOCUMENTS

| JP | 2003-336020 A | 11/2003 |
|---|---|---|
| JP | 2004-059800 A | 2/2004 |
| JP | 2005-250806 A | 9/2005 |
| JP | 2005-298641 A | 10/2005 |
| RU | 2381969 C2 | 2/2010 |
| RU | 111405 U1 | 12/2011 |
| WO | WO 95/06691 A1 | 3/1995 |
| WO | WO 99/37729 A1 | 7/1999 |
| WO | WO 1999/055791 A1 | 11/1999 |
| WO | WO 2008/019994 A1 | 1/2008 |
| WO | WO 2008/028120 A1 | 3/2008 |
| WO | WO 2011/019511 A2 | 2/2011 |
| WO | WO 2012/078249 A2 | 6/2012 |

OTHER PUBLICATIONS

Extended European Search Report dated Aug. 4, 2016 in connection with Application No. 14749538.6.
International Search Report and Written Opinion dated Jul. 31, 2012 in connection with Application No. PCT/US2011/057309.
International Preliminary Report on Patentability dated May 2, 2013 in connection with Application No. PCT/US2011/057309.
International Search Report and Written Opinion dated Apr. 25, 2013 in connection with Application No. PCT/US2013/021846.
International Preliminary Report on Patentability dated Jul. 31, 2014 in connection with Application No. PCT/US2013/021846.
International Search Report dated Aug. 28, 2014 in connection with Application No. PCT/US2014/027392.
International Preliminary Report on Patentability dated Sep. 24, 2015 in connection with Application No. PCT/US2014/027392.
International Search Report dated May 22, 2014 in connection with Application No. PCT/US2014/014755.
International Preliminary Report on Patentability dated Aug. 20, 2015 in connection with Application No. PCT/US2014/014755.
International Search Report and Written Opinion dated Aug. 28, 2014 in connection with Application No. PCT/US2014/028422.
International Preliminary Report on Patentability dated Sep. 24, 2015 in connection with Application No. PCT/US2014/028422.
No Author Listed, Database WPI Week 201002. Thomson Scientific, London, GB. 2009:XP002742926:1 page.
Bartlett et al., Draping polymer adhesives. Polymer Science and Engineering, University of Massachusetts Amherst Gecko Workshop. Jul. 2010: 1 page.
Bartlett et al., Looking beyond fibrillar features to scale gecko-like adhesion. Adv Mater. 2012;24:1078-1083.
Boesel et al., Gecko-inspired surfaces: a path to strong and reversible dry adhesives. Adv Mater. May 18, 2010;22(19):2125-37. doi: 10.1002/adma.200903200.
Chan et al., Designing model systems for enhanced adhesion. MRS Bulletin. Jun. 2007;32(6):496-503.
Creton et al., Materials science of adhesives: how to bond things together. MRS Bulletin. Jun. 2003;28(6):419-423.
Creton, Pressure-sensitive adhesives: an introductory course. MRS Bulletin. Jun. 2003;28(6):434-439.
Creton et al., Sticky feet: from animals to materials. MRS Bulletin. Jun. 2007;32(6):466-472.
Crosby et al., Adhesive failure analysis of pressure-sensitive adhesives. J Poly Sci Part B: Poly Phys. Dec. 1999;37(24):3455-3472.

* cited by examiner (All data obtained with T-Pad)

FIG. 5
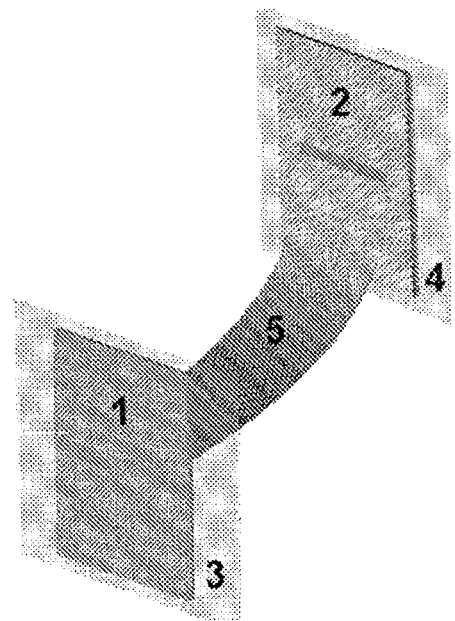
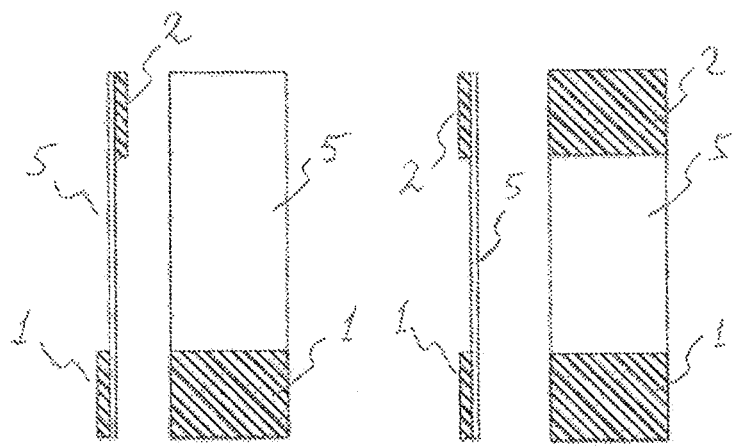
FIG. 6A   FIG. 6B

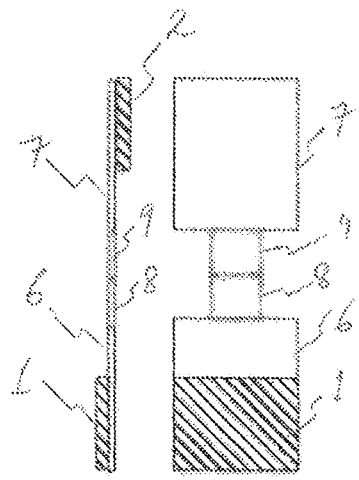
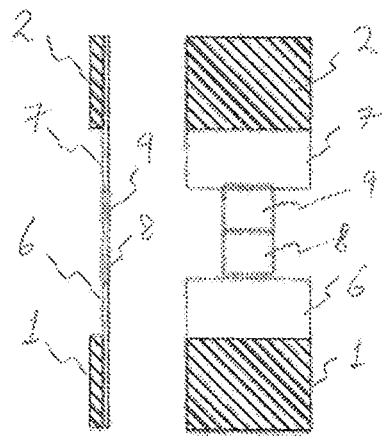
FIG. 9A  FIG. 9B
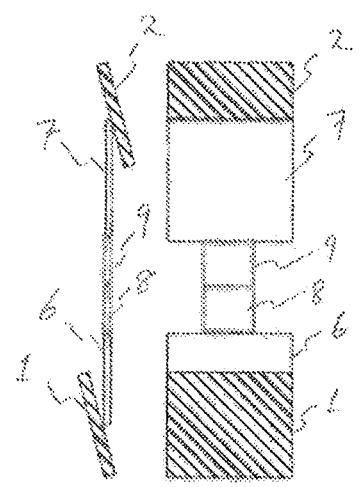
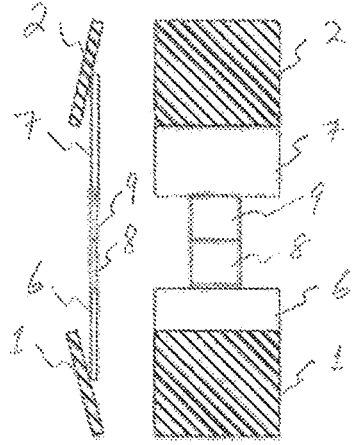
FIG. 10A  FIG. 10B

FIG. 23A
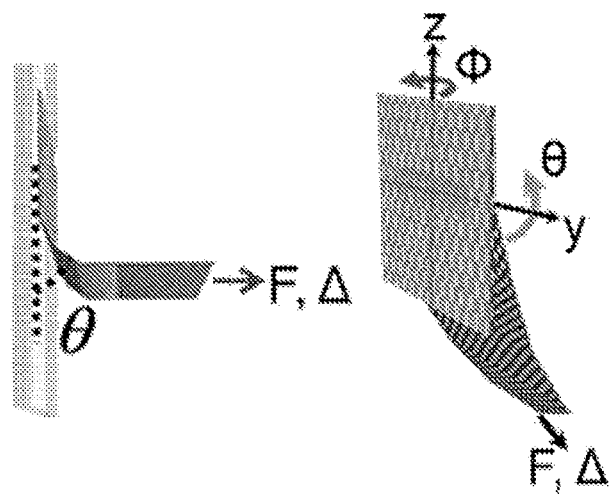
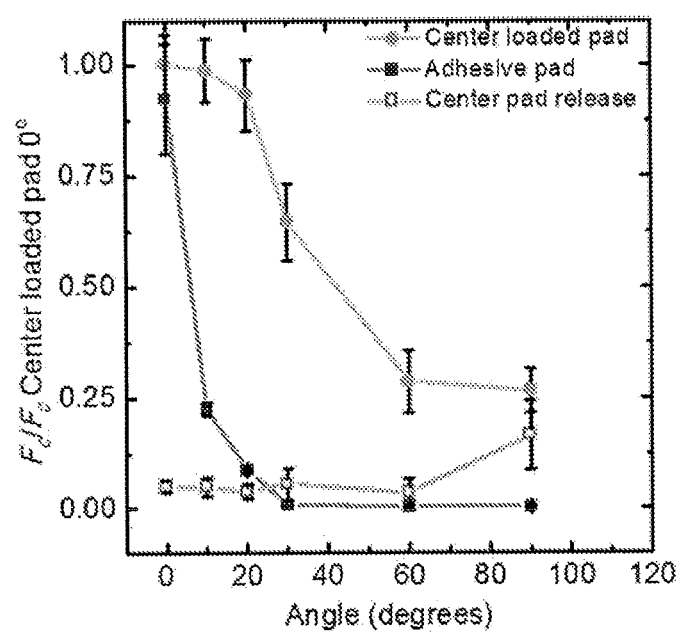
FIG. 23B

DOUBLE- AND MULTI-SIDED ADHESIVE DEVICES

PRIORITY CLAIMS AND RELATED PATENT APPLICATIONS

This application is a continuation and claims the benefit under 35 U.S.C. § 120 of U.S. application Ser. No. 14/372,512, filed on Jul. 16, 2014, which is a national stage filing under 35 U.S.C. § 371 of international application PCT/US2013/021846, filed Jan. 17, 2013, which claims the benefit of priority under 35 U.S.C. § 119(e) to U.S. Provisional Application Ser. No. 61/588,241, filed on Jan. 19, 2012, each of which is herein incorporated by reference in its entirety.

TECHNICAL FIELD OF THE INVENTION

The invention generally relates to designs, devices, materials and methods useful for weight-bearing. More particularly, the invention relates to designs, devices, systems, materials and fabrication methods that provide adhesive devices that are double or multiple sided and are capable of adhering to two or more surfaces simultaneously. Such devices are high-load bearing, easily released, and suitable for extended/repeated use in a variety of applications.

BACKGROUND OF INVENTION

Adhesive materials that can support high capacity loads have traditionally been sought. Pressure sensitive adhesives (PSAs) are adhesives that form a bond when pressure is applied to marry the adhesive with the adherend. Conventional PSAs have found use in pressure sensitive tapes, labels, note pads, automobile interior trims, and a wide variety of other products. PSAs typically rely on ubiquitous surface force interactions, such as van der Waals forces, to transfer stress across an interface. PSAs can adhere to a surface because the adhesive is soft enough to flow, or wet, the adherend. The adhesive needs to be hard enough to resist flow when stress is applied to the bond at the interface. PSAs exhibit viscoelastic (viscous and elastic) properties, both of which may be used for creating proper bonding.

Currently, PSAs are mainly fabricated from soft, viscoelastic polymer materials (e.g., coatings), which are used either independently or in conjunction with a backing material, such as a stiff film or cloth. To control the level of adhesion, PSAs alter their bulk properties by relying upon a complex formulation of both elastic and viscoelastic components to delicately balance the ability of a material to form an interface (or "wet a surface") and the resistance to separation once the interface is formed. (Benedek, et al. Eds. 2009 *Handbook of Pressure Sensitive Adhesives and Products Series, CRC Press: Boca Raton*; Pocius, 2002, *Adhesion and Adhesives Technology: An Introduction*, Hanser Publ.: Munich; Crosby, et al. 1999 *J. Poly. Sci. Part B: Polym. Phys.* 37, 24, 3455-3472; Creton, 2003 *"Materials Science of Adhesives: How to Bond Things Together." MRS Bulletin* 28, 6, 419-421; Creton, 2003 *"Pressure-sensitive adhesives: An introductory course." MRS Bulletin* 28, 6, 434-439; Creton, et al. 2007 *"Sticky Feet: From Animals to Materials", MRS Bulletin* 32, 6, all pages; Chan, et al. 2007 *"Designing Model Systems for Enhanced Adhesion." MRS Bulletin* 32, 6, 496-503; Boesel, et al. 2010 *Advanced Materials* 22, 19, 2125-2137.)

Among the various aspects of PSA designs, three factors are typically relevant and emphasized: (1) Conventional PSAs are viscoelastic to allow the polymer coating to conform easily with a rough surface while dissipating mechanical energy (i.e., pressure) that is required for conformality; (2) A measure for strong PSA materials is tack energy, which is the total energy dissipated during the separation of a PSA/substrate interface; (3) High tack PSAs are typically not conducive to multiple loading applications due to the irreversible (i.e. inelastic) materials processes that are used to produce high levels of tack.

To develop adhesive material systems that overcome some of the disadvantages of conventional PSAs, much research has focused on the development of gecko-like adhesive systems. Some key attributes of both conventional PSAs and ideal gecko-like adhesives are provided in the following table:

| Property | Conventional PSA | Ideal "Gecko-Like" Adhesive |
| --- | --- | --- |
| Max Shear Stress | High | High |
| Max Normal Stress | High | High |
| Peel Resistance | High | Low (after reaching critical peel angle) |
| Energy of Separation | High | Low |
| Reversibility | Limited to None | High |
| Time/Temp Dependence | High | Unknown |
| Impact of Fouling | High | Limited |

Additionally, the adhesive surface of geckos, and similar examples in Nature, is commonly described as "dry", i.e., that adhesion does not rely upon liquid interactions, liquid-to-solid transitions like an epoxy, nor does the adhesive surface feel "tacky" to the touch like a conventional viscoelastic adhesive. Although such attributes are known and displayed in Nature, the primary design factors or mechanisms that permit good control of properties is not known and remains the subject of current research projects worldwide. To our knowledge, the development of a synthetic analog to a gecko-like adhesive has not been demonstrated, in particular one that could be used on macroscopic length scales.

A recent technological breakthrough was a class of elastomer-based adhesive devices that have high load capacity, are reusable, easy release and suitable for extended and repeated use. While the technology substantially advances the state of the art in adhesive technology, there remains a significant and ongoing need for designs, systems, devices, materials and related fabrication methods for adhesive systems having dual or multiple adhesive surfaces that can be used to easily attach and support high capacity loads, yet provide simple, non-damaging release and repeated use while being cost-effective to produce.

SUMMARY OF INVENTION

The invention provides unique releasable adhesive devices that are capable of simultaneously adhering to two or multiple target surfaces of various nature and allow high load capacity, are reusable, easy release and suitable for extended and repeated use. Adhesive systems and devices, as well as related methods, disclosed herein can be designed, for example, to fit a number of applications ranging from household weight-bearing shelves and holders, components for transportation, athletic equipment, labels and advertising posts, automobile interior trims, permanent or reversible fasteners, as well as instruments and devices for industrial, commercial, medical or military applications.

In one aspect, the invention generally relates to a releasable, surface-adhesive device capable of simultaneous adhesion to two or more target surfaces. The device includes: two or more adhesive pads and a tether component attached to the two or more adhesive pads to form a surface-adhesive device capable of simultaneous adhesion to two or more target surfaces. Each adhesive pad independently includes: a planar backing layer having high in-plane stiffness, and a planar layer of an elastic material having an adhesive surface on at least one side for adhering to a target surface, wherein the elastic material is impregnated onto the backing layer on at least the side opposing the adhesive surface.

In certain embodiments, the device includes two (a first and a second) adhesive pads. Each independently includes: a planar layer of an elastic material having an adhesive surface on one side for adhering to a target surface; and a planar backing layer having high in-plane stiffness, wherein the backing layer is impregnated onto the layer of the elastic material on the side opposing the adhesive surface. The tether component has a proximal end and a distal end, the proximal end being attached to the first planar backing layer and the distal end being attached to the second planar backing layer.

In certain preferred embodiments, the planar backing layer of the first adhesive pad, the tether component, and the planar backing layer of the second adhesive pad together consecutively form a single continuous planar component. In certain preferred embodiments, the adhesive surface of the first adhesive pad and the adhesive surface of the second adhesive pad are on the same side of the single continuous planar component. In certain preferred embodiments, the adhesive surface of the first adhesive pad and the adhesive surface of the second adhesive pad are on the opposite side of the single continuous planar component.

In certain preferred embodiments, the planar backing layer of the first adhesive pad is attached to the proximal end of the tether component, and the tether component at the distal end is attached to the backing layer of the second adhesive pad. The planar backing layer of the first adhesive pad, the tether component, and the planar backing layer of the second adhesive pad do not to consecutively form a single continuous planar component. In certain preferred embodiments, the adhesive surface of the first adhesive pad and the adhesive surface of the second adhesive pad are placed on the same side of the tether component. In certain preferred embodiments, the adhesive surface of the first adhesive pad and the adhesive surface of the second adhesive pad are placed on the opposite side of the tether component. The proximal end of the tether component may be attached substantially at the center of the backing layer of the first adhesive pad and the distal end of the tether component is attached substantially at the center of the backing layer of the second adhesive pad. The proximal end of the tether component may also be attached substantially away from the center of the backing layer of the first adhesive pad and the distal end of the tether component is attached substantially away from the center of the backing layer of the second adhesive pad. It is to be noted that any suitable attachments may be employed dependent on the specific applications.

In certain preferred embodiments, the planar backing layer of the first adhesive pad and the tether component together form a single continuous planar component, and wherein the planar backing layer of the second adhesive pad together do not form a single continuous planar component.

In yet another aspect, the invention generally relates to a releasable, surface-adhesive system capable of simultaneous adhesion to two target surfaces. The system includes: a first adhesive pad; a first tether component; a second adhesive pad; and a second tether component. (The first adhesive pad includes: a first planar backing layer having high in-plane stiffness; and a first planar layer of an elastic material having a first adhesive surface on at least one side for adhering to a target surface, wherein the elastic material is impregnated onto the first planar backing layer on at least the side opposing the first adhesive surface. The first tether component is attached to the first adhesive pad via an attachment to the first planar backing layer. The second adhesive pad includes: a second planar backing layer having high in-plane stiffness; and a second planar layer of an elastic material having a second adhesive surface on at least one side for adhering to a target surface, wherein the elastic material is impregnated onto the second planar backing layer on at least the side opposing the second adhesive surface. The second tether component is attached to the second adhesive pad via an attachment to the second planar backing layer. Each of the first and second tether components, respectively, comprises a first and a second fastener being able to mechanically join the first and the second tether components via a locking mechanism between the first and the second fasteners.)

In certain preferred embodiments, the first planar backing layer and the first tether component together consecutively form a first single continuous planar component, and wherein the second planar backing layer and the second tether component together consecutively form a second single continuous planar component. In certain preferred embodiments, when the first and the second fasteners are mechanically joined via a locking mechanism, the adhesive surface of the first adhesive pad and the adhesive surface of the second adhesive pad are on the same side of the single continuous planar component. In certain preferred embodiments, when the first and the second fasteners are mechanically joined via a locking mechanism, the adhesive surface of the first adhesive pad and the adhesive surface of the second adhesive pad are on the opposite side of the single continuous planar component.

In certain preferred embodiments, the first planar backing layer and the first tether component together do not form a single continuous planar component, and wherein the second planar backing layer and the second tether component together do not form a single continuous planar component. In certain preferred embodiments, when the first and the second fasteners are mechanically joined via a locking mechanism, the adhesive surface of the first adhesive pad and the adhesive surface of the second adhesive pad are placed on the same side of the tether component. In certain preferred embodiments, when the first and the second fasteners are mechanically joined via a locking mechanism, the adhesive surface of the first adhesive pad and the adhesive surface of the second adhesive pad are placed on the opposite side of the tether component.

The proximal end of the first tether component may be attached substantially at the center of the planar backing layer of the first adhesive pad, and the proximal end of the second tether component is attached substantially at the center of the planar backing layer of the second adhesive pad. The proximal end of the first tether component may also attached substantially away from the center of the backing layer of the first adhesive pad, and the distal end of the second tether component is attached substantially away from the center of the planar backing layer of the second adhesive pad. Any suitable attachments may be employed dependent on the specific applications.

In yet another aspect, the invention generally relates to a releasable, surface-adhesive device capable of simultaneous adhesion to two or more target surfaces. The device includes: two or more planar layers each comprising an elastic material, wherein each planar layer has on one side an adhesive surface for adhering to a target surface and on the other side a backing layer having high in-plane stiffness, wherein the elastic material impregnating into the backing layer. A portion of each backing layer extends beyond the layer of the elastic material to form an area of the backing layer un-impregnated with the elastic material.

In certain preferred embodiments, the first planar backing layer and the first tether component together form a first single continuous planar component, and wherein the second planar backing layer and the second tether component together do not form a second single continuous planar component.

In yet another aspect, the invention generally relates to a method for releasably holding a weight simultaneously on two or more target surfaces. The method includes: providing a releasable, surface-adhesive device; and attaching a weight to the device. The releasable, surface-adhesive device includes a first and a second adhesive pads and a tether component. Each adhesive pad independently includes: (1) a planar layer of an elastic material having an adhesive surface on one side for adhering to a target surface; and (2) a planar backing layer having high inplane stiffness, wherein the backing layer is impregnated onto the layer of the elastic material on the side opposing the adhesive surface. The tether component has a proximal end and a distal end, wherein the proximal end is attached to the first planar backing layer and the distal end is attached to the second planar backing layer.

In yet another aspect, the invention generally relates to a method for releasably holding a weight simultaneously on two or more target surfaces. The method includes: providing a releasable, surface-adhesive system; and attaching a weight to the device. The releasable, surface-adhesive system includes: a first adhesive pad, a first tether component, a second adhesive pad, and a second tether component. The first adhesive pad include: (1) a first planar backing layer having high in-plane stiffness; and (2) a first planar layer of an elastic material having a first adhesive surface on at least one side for adhering to a target surface, wherein the elastic material is impregnated onto the first planar backing layer on at least the side opposing the first adhesive surface. The first tether component is attached to the first adhesive pad via an attachment to the first planar backing layer. The second adhesive pad includes: (1) a second planar backing layer having high in-plane stiffness; and (2) a second planar layer of an elastic material having a second adhesive surface on at least one side for adhering to a target surface, wherein the elastic material is impregnated onto the second planar backing layer on at least the side opposing the second adhesive surface. The second tether component is attached to the second adhesive pad via an attachment to the second planar backing layer. Each of the first and second tether components, respectively, comprises a first and a second fastener being able to mechanically join the first and the second tether components via a locking mechanism between the first and the second fasteners.

In yet another aspect, the invention generally relates to a method for making a releasable, surface-adhesive device. The method includes: providing in sequence a rigid backing layer, a layer of a first elastic material impregnated on a fabric material, a spacer layer, a layer of a second elastic material on a fabric material, and a substrate layer; and assembling the releasable, surface-adhesive device by pressing the layers together.

BRIEF DESCRIPTION OF DRAWINGS

FIG. 5 shows a schematic illustration of an exemplary embodiment of a double-sided adhesive device.

FIGS. 6A-6B show a schematic illustration of an exemplary embodiment of a double-sided adhesive device.

FIGS. 9A-9B show a schematic illustration of an exemplary embodiment of a double-sided adhesive device.

FIGS. 10A-10B show a schematic illustration of an exemplary embodiment of a double-sided adhesive device.

FIG. 23A shows schematic illustrations of the loading angle dependence for the high capacity and easy release adhesive pads.

FIG. 23B shows exemplary results of the angle dependence of the center loaded pad compared to a single slab adhesive pad, where the center loaded pad maintains a high failure force throughout various loading angles, while still allowing for easy release.

DETAILED DESCRIPTION OF INVENTION

The invention provides unique releasable adhesive devices, as well as related methods, that enable simultaneously adherence to two or multiple target surfaces of various nature and allow high load capacity, are reusable, easy release and suitable for extended and repeated use. Adhesive systems and devices of the invention may be designed to fit a variety of utilities (e.g., household weight-bearing shelves and holders, components for transportation, athletic equipment, labels and advertising posts, automobile interior trims, permanent or reversible fasteners, as well as instruments and devices for industrial, commercial, medical or military applications).

The invention differs from prior art in the field of PSAs at least in that the present invention does not rely on viscoelastic properties to achieve performance controls, as do PSAs. Designs and systems of the invention allow separation time and energy to be minimized, while maintaining the ability to support extremely high-weight loads. In contrast to prior art in the development of gecko-type adhesives, the designs, systems and methods disclosed herein do not require the use of surface fibrillar structures to achieve desired attributes. Following the principles disclosed herein, one may mimic the engineering design of the toe and leg structures of common examples in Nature, such as geckos in vertical climbing. Other key differences between the present invention and the prior art relate to, among others, the specific designation of rotational freedom at continuous junctions, specifications of stiffness in loading direction with low flexural rigidity perpendicular to surface of elastic material, and the ability to achieve high capacity load support under both normal and shear loading directions with near-zero required "pre-load" (referring to the amount of force that is required to establish the adhesive/substrate interface for supporting a given load).

Figure 1:
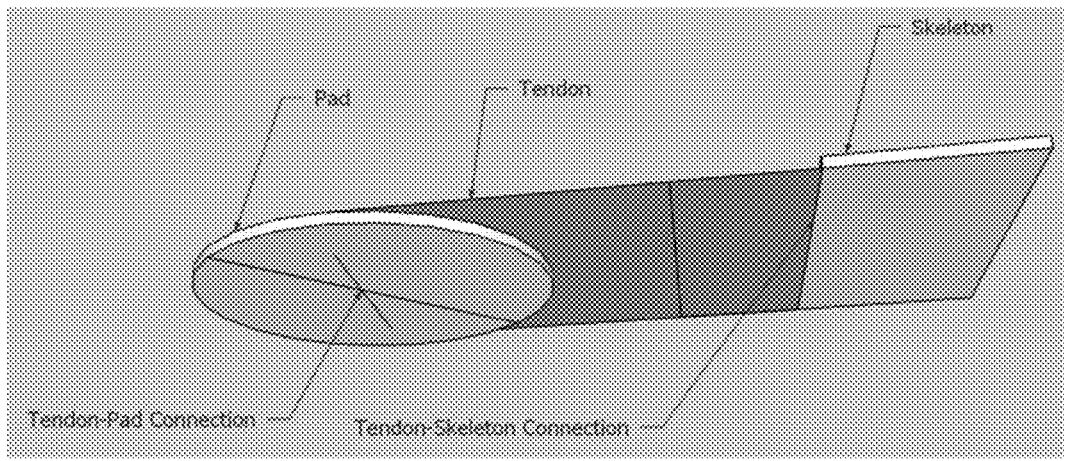
FIG. 1 shows a schematic illustration of an exemplary embodiment of the invention.

As a component of the present invention, the adhesive pad system utilized herein employs a "dry" adhesive pad structure, sometimes referred to as a "T-pad", an embodiment of which is schematically illustrated in FIG. 1. Properly designed, the T-pad device can support high loads under shear, normal, and multi-mode (i.e. peel) loadings while requiring minimal forces and energy for release (or separation) under specifically-designed release strategies.

The basic structure of the adhesive device is referred to as the "pad", which is subsequently connected to a tether (e.g., a synthetic fabric tether), which may be referred to as the "tendon". The tether should maintain high stiffness along the primary axis of loading. The connection between the tendon and the pad has pre-defined dimensions, orientation, and spatial location, according to particular needs, that can be modified to control the release strategy and provide tolerated balance of shear and normal loading.

Figure 2:
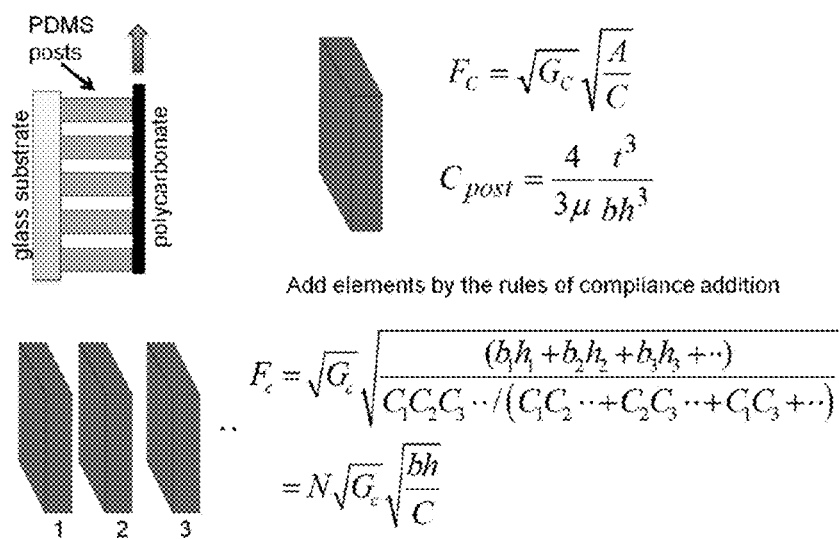
FIG. 2 shows certain design factors and schematic illustrations.
Figure 3:
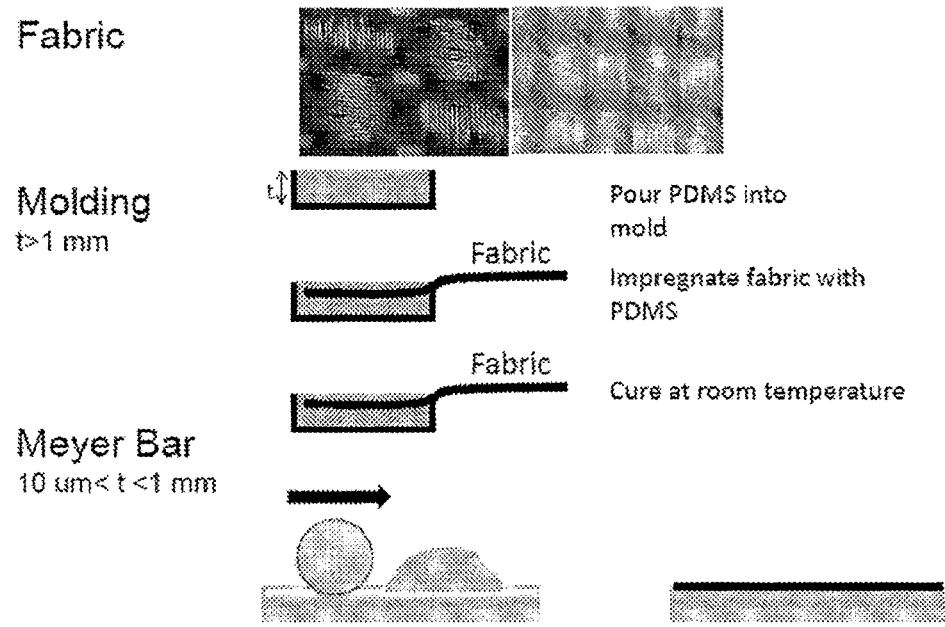
FIG. 3 shows a schematic illustration of an exemplary fabrication process.

This approach represents a unique combination of adhesion attributes of polymer materials and integrated mechanical designs through proper conservation of rotational freedom, low flexural modulus normal to the adhesive interface, and high stiffness in load bearing directions. A scaling relationship has been developed by the inventors to provide a framework for understanding the adhesive performance of the materials devices over a range of size scales and geometries (FIG. 2). This scaling relationship suggests that the adhesive capacity ($F_c$) of an interface is governed by three simple parameters, which are dependent on both the geometry and material properties of the interface. To design reversible adhesives which can adhere to various substrates, the interfacial interactions ($G_c$) should rely upon non-specific van der Waals forces, rendering $G_c$ an ineffective control parameter. Therefore, to scale $F_c$ for adhesive materials the material system must not just rely on area on contact (A) or the system compliance (C) but must develop attributes that increase the A/C ratio. This presents a challenge; materials must be soft to increase true contact but stiff to achieve high loads. Soft materials are able to create large-scale contact but have a high compliance when loaded, while stiff materials are unable to create extensive contact; both cases result in a null effect on the A/C ratio. The current invention provides a mechanism for maximizing A/C, and most importantly, tuning this governing parameter for different applications. As schematically illustrated in FIG. 3, an efficient and effective fabrication method may be used to fabricate the T-pad. The method involves integrating a thin layer of an elastic elastomer into a surface of a fabric.

The tether (tendon) can be connected to the pad through any suitable methods, such as conventional sewing, stitching, or gluing, which allows easy control of dimensional, orientational, and spatial location of the attachment. The attachment should provide sufficient load sharing and load bearing capacity, which can be controlled through the stitching pattern, width, and length. Appropriate stitching patterns include straight stitching, zigzag stitching, multi zigzag stitch, satin stitching, honeycomb stitching, ladder stitch, double overlock stitch, and criss-cross stitching.

For example, a particularly advantageous tether-pad connection is a straight-line stitch that is centered on the one axis of the pad and extends to a length of approximately ⅔ the chord length perpendicular the second pad axis. The tether-pad connection should maintain rotational freedom while maintaining high stiffness in the direction of loading. The tether-pad connection should preferably maintain equal load sharing along the entire length of the connection.

One T-pad structure can act independently or in conjunction with an array of T-pad structures or units (referred to as a "T-surface"), which may be mounted with rotationally-free joints to a supporting substrate that can be rigid in one or more directions, for example. For certain applications, e.g., a large weight bearing shelf, multiple attachment points for the tether to the adhesive pad may also be employed.

Figure 4:
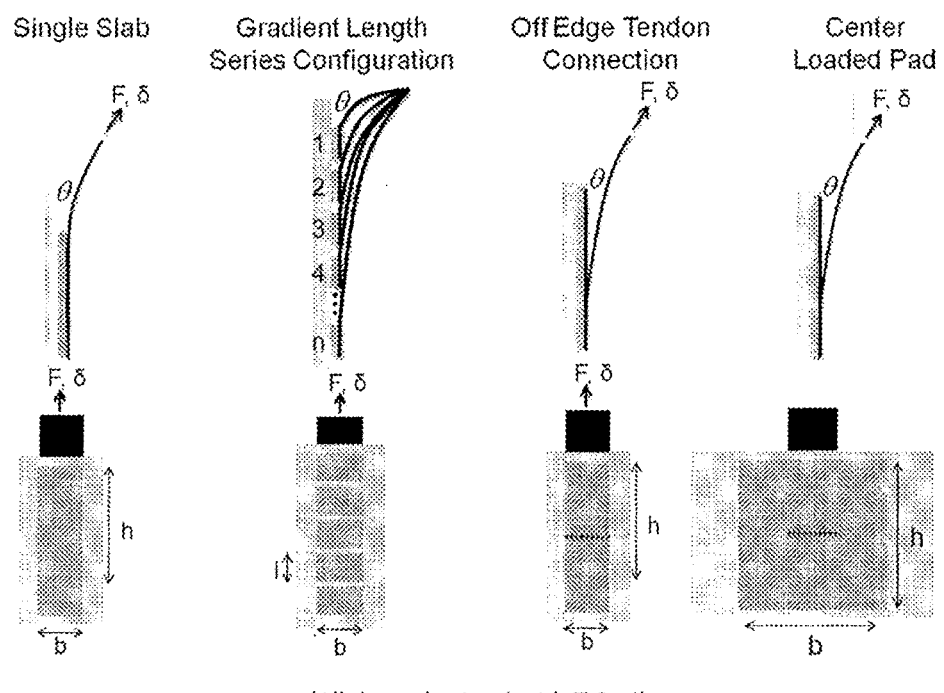
FIG. 4 shows schematic illustrations of various embodiments of the invention for the pad-tether connection.

FIG. 4 shows schematic illustrations of various T-pad configurations for the tether-pad connection. Skeleton connection is not shown. A single slab connection constitutes a continuous adhesive pad and support backing, which can then be divided into a larger number of discrete adhesive pads and support backings in which multiple tendons are used to create different configurations (e.g., a gradient length series configuration). The off edge tendon connection and center loaded pad configurations constitute an adhesive pad and support backing where a planar tether attached to the adhesive pad substantially at the center, where the length of the attachment can be equal to the width in the case of the T-pad or some fraction or the width in the case of the center loaded pad. In both cases the tether attached to the adhesive pad allows for adjustment of the angle between the planar tether and the adhesive pad from about 0° to about 359°.

A schematic illustration of an exemplary embodiment of a double-sided adhesive device is shown in FIG. 5. Adhesive pads 1 and 2 are adhered to target surfaces 3 and 4. Tether 5 connects to adhesive pads 1 and 2. Depending on the applications, target surfaces 3 and 4 may form a variety of angles to each other. The length of tether 5 is subject to variations per requirements of the application.

FIGS. 6A-6B schematically illustrate certain embodiments of the invention. As shown in FIG. 6A, which depicts side and front views of an exemplary configuration of a double-sided adhesive device, tether 5 and the backing layers of adhesive pads 1 and 2 are one piece of fabric material with adhesive pads 1 and 2 on opposite sides of tether 5. In FIG. 6B, which depicts side and front views of another exemplary configuration, tether 5 and the backing layers of adhesive pads 1 and 2 are one piece of fabric material but adhesive pads 1 and 2 are on the same side of tether 5.

Figures 7A, 7B:
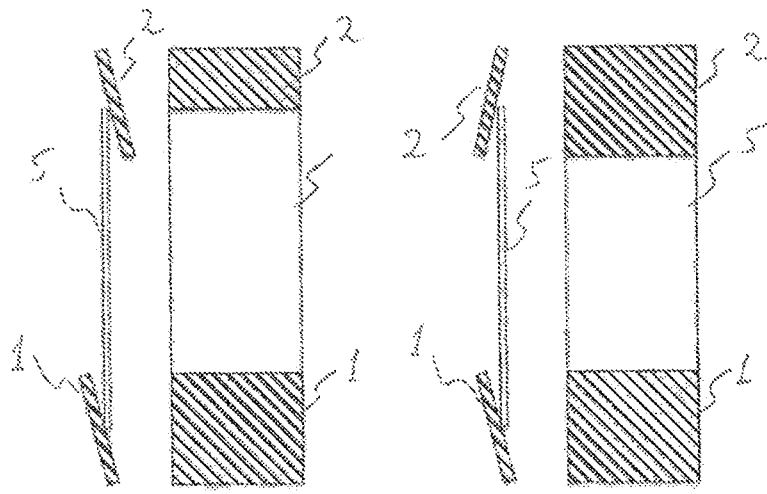
FIGS. 7A-7B show a schematic illustration of an exemplary embodiment of a double-sided adhesive device.

FIGS. 7A-7B schematically illustrate certain embodiments of the invention where the tether and the backing layers of adhesive pads are not a single continuous piece of fabric material. As shown in FIG. 7A, which depicts side and front views of an exemplary configuration of a double-sided adhesive device, tether 5 and the backing layers of adhesive pads 1 and 2 are connected (e.g., may be stitched together) but are not a continuous single piece of fabric material. Each of adhesive pads land 2 forms an angle (e.g., a small acute angle of 1°-15°). In FIG. 7A, the adhesive pads 1 and 2 are attached to tether 5 such that generally face the opposite directions, whereas in FIG. 7B, the adhesive pads 1 and 2 are attached to tether 5 such that generally face the same directions. The attachment of the tether to the adhesive pads 1 and 2 may be at or near the center of the backing of the adhesive pad, but the attachment may also be substantially off-center, for example, as illustrated in FIGS. 8A and 8B.

FIGS. 9A-9B schematically illustrate certain embodiments of the invention where two adhesive pads can be joined together or disengaged by simple mechanical means. As shown in FIG. 9A, which depicts side and front views of an exemplary configuration of a double-sided adhesive device, at its proximal end tether 6 and the backing layer of adhesive pad 1 form one piece of fabric material. At its distal end, tether 6 has a fastener component 8. At its proximal end, tether 7 and the backing layer of adhesive pad 2 form one piece of fabric material. At its distal end, tether 7 has a fastener component 9. Fastener components 8 and 9 can be mechanically joined or separated. Unlike in FIG. 9A where the two adhesive pads face opposite sides of the tether assembly (6-8-9-7), FIG. 9B shows the two adhesive pads are on the same side of the tether assembly.

FIGS. 10A-10B schematically illustrate certain other embodiments of the invention where two adhesive pads can be joined together or disengaged by simple mechanical means. As shown in FIG. 10A, which depicts side and front views of an exemplary configuration of a double-sided adhesive device, fastener components 8 and 9 can be mechanically joined or separated. Unlike in FIG. 10A where the two adhesive pads face opposite sides of the tether assembly (6-8-9-7), FIG. 10B shows the two adhesive pads are on the same side of the tether assembly. The major distinctions between the configurations shown in FIGS. 10A-10B and those depicted in FIGS. 9A-9B is the connection between an adhesive pads and their corresponding tethers. FIGS. 9A-9B provide one-piece continuous pad to tether connectivity whereas FIGS. 10A-10B show distinctive two-piece connectivity.

Figures 8A, 8B:
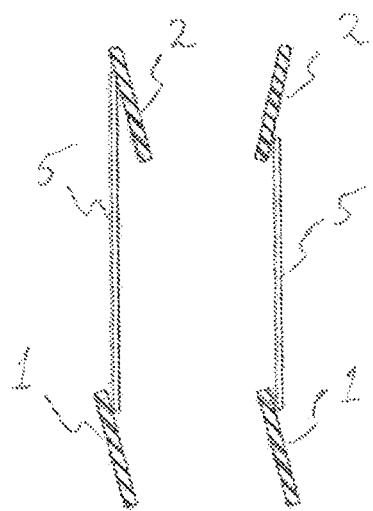
FIGS. 8A-8B show a schematic illustration of an exemplary embodiment of a double-sided adhesive device.
Figures 11A, 11B:
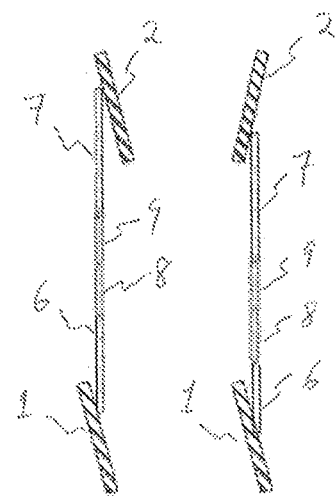
FIGS. 11A-11B show a schematic illustration of an exemplary embodiment of a double-sided adhesive device.

Similar to the illustrations in FIGS. 8A-8B, the attachments of the tether 6 to adhesive pad 1 and tether 7 to adhesive pad 2 may be at or near the center of the backing of the adhesive pad, but the attachments may also be substantially off-center as illustrated in FIGS. 11A and 11B, showing two exemplary embodiments: both adhesive pats are attached off-center as in FIG. 11A and one adhesive pad is attached off-center as in FIG. 11B.

Figures 12A, 12B, 12C:
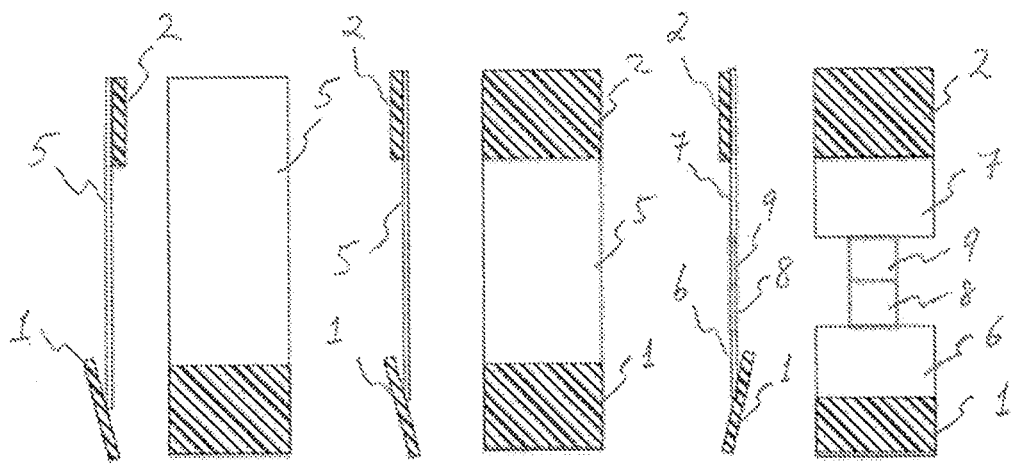
FIGS. 12A-12C show a schematic illustration of an exemplary embodiment of a double-sided adhesive device.

FIGS. 12A and 12B schematically illustrates exemplary hybrid configurations where continuous one-piece connectivity and discontinuous two-piece connectivity are found in one system (with FIG. 12A showing an embodiment where the two adhesive pads face generally opposite directions, while in FIG. 12B the two adhesive pads face generally the same direction). FIG. 12C shows an embodiment where fasteners are used to engage or disengage separate adhesive pad/tether assemblies.

In one aspect, the invention generally relates to a releasable, surface-adhesive device capable of simultaneous adhesion to two or more target surfaces. The device includes: two or more adhesive pads and a tether component attached to the two or more adhesive pads to form a surface-adhesive device capable of simultaneous adhesion to two or more target surfaces. Each adhesive pad independently includes: a planar backing layer having high in-plane stiffness, and a planar layer of an elastic material having an adhesive surface on at least one side for adhering to a target surface, wherein the elastic material is impregnated onto the backing layer on at least the side opposing the adhesive surface.

In certain embodiments, the device includes two (a first and a second) adhesive pads. Each independently includes: a planar layer of an elastic material having an adhesive surface on one side for adhering to a target surface; and a planar backing layer having high in-plane stiffness, wherein the backing layer is impregnated onto the layer of the elastic material on the side opposing the adhesive surface. The tether component has a proximal end and a distal end, the proximal end being attached to the first planar backing layer and the distal end being attached to the second planar backing layer.

In certain preferred embodiments, the planar backing layer of the first adhesive pad, the tether component, and the planar backing layer of the second adhesive pad together consecutively form a single continuous planar component. In certain preferred embodiments, the adhesive surface of the first adhesive pad and the adhesive surface of the second adhesive pad are on the same side of the single continuous planar component. In certain preferred embodiments, the adhesive surface of the first adhesive pad and the adhesive surface of the second adhesive pad are on the opposite side of the single continuous planar component.

In certain preferred embodiments, the planar backing layer of the first adhesive pad is attached to the proximal end of the tether component, and the tether component at the distal end is attached to the backing layer of the second adhesive pad. The planar backing layer of the first adhesive pad, the tether component, and the planar backing layer of the second adhesive pad do not to consecutively form a single continuous planar component. In certain preferred embodiments, the adhesive surface of the first adhesive pad and the adhesive surface of the second adhesive pad are placed on the same side of the tether component. In certain preferred embodiments, the adhesive surface of the first adhesive pad and the adhesive surface of the second adhesive pad are placed on the opposite side of the tether component. The proximal end of the tether component may be attached substantially at the center of the backing layer of the first adhesive pad and the distal end of the tether component is attached substantially at the center of the backing layer of the second adhesive pad ("center-load"). The proximal end of the tether component may also be attached substantially away from the center of the backing layer of the first adhesive pad and the distal end of the tether component is attached substantially away from the center of the backing layer of the second adhesive pad ("off-center-load"). Any suitable attachments may be employed dependent on the specific applications, including a hybrid of center-load and off-center-load (where one adhesive pad-tether attachment is center-load and one adhesive pad-tether attachment is off-center-load).

In certain preferred embodiments, the planar backing layer of the first adhesive pad and the tether component together form a single continuous planar component, and wherein the planar backing layer of the second adhesive pad together do not form a single continuous planar component.

In yet another aspect, the invention generally relates to a releasable, surface-adhesive system capable of simultaneous adhesion to two target surfaces. The system includes: a first adhesive pad; a first tether component; a second adhesive pad; and a second tether component. (The first adhesive pad includes: a first planar backing layer having high in-plane stiffness; and a first planar layer of an elastic material having a first adhesive surface on at least one side for adhering to a target surface, wherein the elastic material is impregnated onto the first planar backing layer on at least the side opposing the first adhesive surface. The first tether component is attached to the first adhesive pad via an attachment to the first planar backing layer. The second adhesive pad includes: a second planar backing layer having high in-plane stiffness; and a second planar layer of an elastic material having a second adhesive surface on at least one side for adhering to a target surface, wherein the elastic material is impregnated onto the second planar backing layer on at least the side opposing the second adhesive surface. The second tether component is attached to the second adhesive pad via an attachment to the second planar backing layer. Each of the first and second tether components, respectively, comprises a first and a second fastener being able to mechanically join the first and the second tether components via a locking mechanism between the first and the second fasteners.

In certain preferred embodiments, the first planar backing layer and the first tether component together consecutively form a first single continuous planar component, and wherein the second planar backing layer and the second tether component together consecutively form a second single continuous planar component. In certain preferred embodiments, when the first and the second fasteners are mechanically joined via a locking mechanism, the adhesive surface of the first adhesive pad and the adhesive surface of the second adhesive pad are on the same side of the single continuous planar component. In certain preferred embodiments, when the first and the second fasteners are mechanically joined via a locking mechanism, the adhesive surface of the first adhesive pad and the adhesive surface of the second adhesive pad are on the opposite side of the single continuous planar component.

In certain preferred embodiments, the first planar backing layer and the first tether component together do not form a single continuous planar component, and wherein the second planar backing layer and the second tether component together do not form a single continuous planar component. In certain preferred embodiments, when the first and the second fasteners are mechanically joined via a locking mechanism, the adhesive surface of the first adhesive pad and the adhesive surface of the second adhesive pad are placed on the same side of the tether component. In certain preferred embodiments, when the first and the second fasteners are mechanically joined via a locking mechanism, the adhesive surface of the first adhesive pad and the adhesive surface of the second adhesive pad are placed on the opposite side of the tether component.

The proximal end of the first tether component may be attached substantially at the center of the planar backing layer of the first adhesive pad, and the proximal end of the second tether component is attached substantially at the center of the planar backing layer of the second adhesive pad. The proximal end of the first tether component may also attached substantially away from the center of the backing layer of the first adhesive pad, and the distal end of the second tether component is attached substantially away from the center of the planar backing layer of the second adhesive pad. Any suitable attachments may be employed dependent on the specific applications.

In yet another aspect, the invention generally relates to a releasable, surface-adhesive device capable of simultaneous adhesion to two or more target surfaces. The device includes: two or more planar layers each comprising an elastic material, wherein each planar layer has on one side an adhesive surface for adhering to a target surface and on the other side a backing layer having high in-plane stiffness, wherein the elastic material impregnating into the backing layer. A portion of each backing layer extends beyond the layer of the elastic material to form an area of the backing layer un-impregnated with the elastic material.

In certain preferred embodiments, the first planar backing layer and the first tether component together form a first single continuous planar component, and wherein the second planar backing layer and the second tether component together do not form a second single continuous planar component.

In yet another aspect, the invention generally relates to a method for releasably holding a weight simultaneously on two or more target surfaces. The method includes: providing a releasable, surface-adhesive device; and attaching a weight to the device. The releasable, surface-adhesive device includes a first and a second adhesive pads and a tether component. Each adhesive pad independently includes: (1) a planar layer of an elastic material having an adhesive surface on one side for adhering to a target surface; and (2) a planar backing layer having high inplane stiffness, wherein the backing layer is impregnated onto the layer of the elastic material on the side opposing the adhesive surface. The tether component has a proximal end and a distal end, wherein the proximal end is attached to the first planar backing layer and the distal end is attached to the second planar backing layer.

In yet another aspect, the invention generally relates to a method for releasably holding a weight simultaneously on two or more target surfaces. The method includes: providing a releasable, surface-adhesive system; and attaching a weight to the device. The releasable, surface-adhesive system includes: a first adhesive pad, a first tether component, a second adhesive pad, and a second tether component. The first adhesive pad include: (1) a first planar backing layer having high in-plane stiffness; and (2) a first planar layer of an elastic material having a first adhesive surface on at least one side for adhering to a target surface, wherein the elastic material is impregnated onto the first planar backing layer on at least the side opposing the first adhesive surface. The first tether component is attached to the first adhesive pad via an attachment to the first planar backing layer. The second adhesive pad includes: (1) a second planar backing layer having high in-plane stiffness; and (2) a second planar layer of an elastic material having a second adhesive surface on at least one side for adhering to a target surface, wherein the elastic material is impregnated onto the second planar backing layer on at least the side opposing the second adhesive surface. The second tether component is attached to the second adhesive pad via an attachment to the second planar backing layer. Each of the first and second tether components, respectively, comprises a first and a second fastener being able to mechanically join the first and the second tether components via a locking mechanism between the first and the second fasteners.

In yet another aspect, the invention generally relates to a method for making a releasable, surface-adhesive device. The method includes: providing in sequence a rigid backing layer, a layer of a first elastic material impregnated on a fabric material, a spacer layer, a layer of a second elastic material on a fabric material, and a substrate layer; and assembling the releasable, surface-adhesive device by pressing the layers together. In certain embodiments, the layer of the first elastic material is prepared by: providing the first elastic material and a curing agent in a mold; impregnating the first elastic material to a fabric material placed over the mold; and curing the first elastic material. In certain preferred embodiments, the first elastic material is polydimethylsiloxane and curing is performed at room temperature, the second elastic material is polyurethane, the spacer layer and the substrate layer are polytetrafluoroethylene.

An adhesive surfaces may be microscopically smooth or patterned, for example. A backing layer may be a fabric backing layer. A planar layer of an elastic material may comprise the same elastic material or different elastic materials.

Each layer of the elastic material may have any desirable shape including a substantially circular outer boundary, a substantially rectangular outer boundary, a substantially irregular outer boundary, a substantially elliptical outer boundary, for examples.

In certain preferred embodiments, the elastic material is a block copolymer elastomer.

In certain preferred embodiments, the elastic material comprises one or more of siloxane-based elastomers, urethane-based elastomers, and acrylate-based elastomers.

In some embodiments, each layer of an elastic material comprises two or more separate smaller elastic material layer units.

In certain embodiments, each planar layer of the elastic material has a smooth adhesive surface area from about 0.01 $cm^2$ to about 1000 $cm^2$ (e.g., about 0.01 $cm^2$, 0.05 $cm^2$, 0.1 $cm^2$, 0.5 $cm^2$, 1 $cm^2$, 2 $cm^2$, 5 $cm^2$, 10 $cm^2$, 20 $cm^2$, 50 $cm^2$, 100 $cm^2$, 200 $cm^2$, 500 $cm^2$, 1,000 $cm^2$) and has a substantially uniform thickness from about 0.0001 cm to about 0.5 cm (e.g., 0.0001 cm, 0.0005 cm, 0.001 cm, 0.005 cm, 0.01 cm, 0.05 cm, 0.1 cm, 0.2, 0.5 cm). In certain embodiments, the planar layer of the elastic material has a smooth adhesive surface area of greater than about 0.01 $cm^2$ and has a substantially uniform thickness of less than about 0.001 cm. In certain embodiments, the planar layer of the elastic material has a smooth adhesive surface area of greater than about 0.05 $cm^2$ and has a substantially uniform thickness of less than about 0.005 cm. In certain embodiments, the planar layer of the elastic material has a smooth adhesive surface area of greater than about 0.1 $cm^2$ and has a substantially uniform thickness of less than about 0.01 cm. In certain embodiments, the planar layer of the elastic material has a smooth adhesive surface area of greater than about 0.2 $cm^2$ and has a substantially uniform thickness of less than about 0.5 cm. In certain embodiments, the planar layer of the elastic material has a smooth adhesive surface area of greater than about 0.5 $cm^2$ and has a substantially uniform thickness of less than about 0.2 cm. In certain embodiments, the planar layer of the elastic material has a smooth adhesive surface area of greater than about 1.0 $cm^2$ and has a substantially uniform thickness of less than about 0.1 cm. In certain embodiments, the planar layer of the elastic material has a smooth adhesive surface area of greater than about 5.0 $cm^2$ and has a substantially uniform thickness of less than about 0.05 cm. In certain embodiments, the planar layer of the elastic material has a smooth adhesive surface area of greater than about 10 $cm^2$ and has a substantially uniform thickness of less than about 0.02 cm. In certain embodiments, the planar layer of the elastic material has a smooth adhesive surface area of greater than about 100 $cm^2$ and has a substantially uniform thickness of less than about 0.01 cm. In certain embodiments, the planar layer of the elastic material has a smooth adhesive surface area from about 10 $cm^2$ to about 100 $cm^2$ and has a substantially uniform thickness from about 0.01 cm to about 0.05 cm. In certain embodiments, the planar layer of the elastic material has a smooth adhesive surface area from about 1,000 $cm^2$ to about 100 $cm^2$ and has a substantially uniform thickness from about 0.5 cm to about 0.05 cm.

In certain embodiments, the elastic material has an elastic modulus from about 0.05 MPa to about 50 MPa (e.g., 0.05 MPa, 0.1 MPa, 0.5 MPa, 1.0 MPa, 5.0 MPa, 10 MPa, 15 MPa, 20 MPa, 30 MPa, 40 MPa, 50 MPa). In certain embodiments, the elastic material has an elastic modulus from about 0.05 MPa to about 50 MPa. In certain embodiments, the elastic material has an elastic modulus from about 0.05 MPa to about 30 MPa. In certain embodiments, the elastic material has an elastic modulus from about 0.05 MPa to about 10 MPa. In certain embodiments, the elastic material has an elastic modulus from about 1 MPa to about 50 MPa. In certain embodiments, the elastic material has an elastic modulus from about 1 MPa to about 30 MPa. In certain embodiments, the elastic material has an elastic modulus from about 1 MPa to about 10 MPa.

The fabric backing layer may include a natural fabric material (e.g., cotton, hemp, wool, silk, bamboo string, cellulose, jute, and pina). The fabric backing layer may also include a synthetic fabric material (e.g., polyester, spandex, nylon, carbon fiber, polyaramid, carbon fiber polyaramid hybrid, carbon fiber basalt hybrid, fiberglass, carbon fiber, or fiberglass hybrid).

In certain embodiments, one or more of the adhesive surfaces may have an area of about 1 $cm^2$ or greater and is capable of bearing a weight of at least 31.5 N per 1 $cm^2$ of adhesive surface area.

In certain embodiments, one or more of the adhesive surfaces may have an area of about 1 $cm^2$ or greater and is capable of bearing a weight of at least 12 N per 1 $cm^2$ of adhesive surface area.

In certain embodiments, one or more of the adhesive surfaces may have an area of about 100 $cm^2$ or greater and is capable of bearing a weight of at least 3150 N per 100 $cm^2$ of adhesive surface area.

In certain embodiments, one or more of the adhesive surfaces may have an area of about 100 $cm^2$ or greater and is capable of bearing a weight of at least 1200 N per 100 $cm^2$ of adhesive surface area.

In certain embodiments, each tether component includes a fabric material. In certain other embodiments, at least one tether component includes a non-fabric material.

The target surface may be any suitable surfaces including that of glass, metal, wood, plastic, paper, cardboard, or concrete.

It is noted that the term "backing", as used herein, includes but is not limited to the situation where the referred to layer or material is the back (or the last) layer of the device structure. According to this invention, a backing layer may be an interior layer or component of a structural arrangement.

Elastic materials that may be used in the adhesive pads include siloxane-based elastomers, urethane-based elastomers, and acrylate-based elastomers. Polydimethylsiloxane (PDMS) belongs to a group of polymeric organosilicon compounds that are commonly referred to as silicones. PDMS, widely used silicon-based organic polymer, has preferred rheological (or flow) properties. PDMS is generally inert, non-toxic and non-flammable.

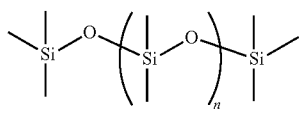

A Polydimethylsiloxane

Other elastic materials that may be used in the adhesive pads include polyurethanes, which are polymers of organic units covalently joined by urethane (carbamate) links.

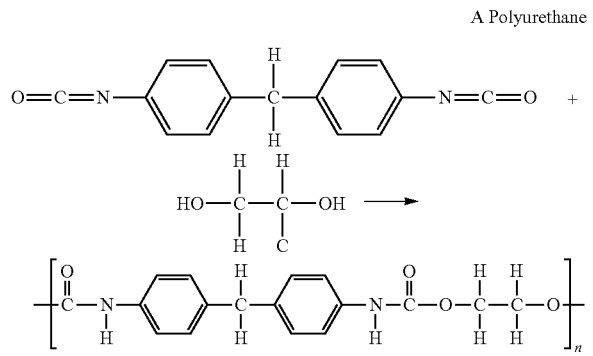

A Polyurethane

A urethane linkage is produced by reacting an isocyanate group, —N=C=O with a hydroxyl group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, R—(N=C=O)$_n$≥2 and a polyol is a molecule with two or more hydroxyl functional groups, R'—(OH)$_n$≥2. The reaction product is a polymer containing the urethane linkage, —RNHCOOR'—. Examples of polyurethane monomers ("pre-polymers") includes hydroxyl ended molecules, such as polyethylene glycol, polypropylene glycol, poly tetramethylene glycol, or bisphenol A (hydroxyl containing monomers) and an aliphatic or aromatic based isocyanate, such as methylene diphenyl diisocyanate, toluene diphenyl diisocyanate, hexamethylene diisocyanate, isophorone diisocyanate, or a polyisocyanate resulting from the combination of multiple of these monomers (for example, three molecules of methylene diphenyl diisocyanate form a trimer which contains three isocyanate functional groups).

In certain embodiments, the material of the fabric backing layer includes a natural fabric material or a synthetic fabric material. In certain embodiments, the material of the fabric backing layer includes a natural fabric material such as cotton, hemp, wool, silk, bamboo string, cellulose, jute or pina. In certain embodiments, the material of the fabric backing layer includes a synthetic fabric of polyester, spandex, nylon, carbon fiber, polyaramid, carbon fiber polyaramid hybrid, carbon fiber basalt hybrid, fiberglass, or fiberglass hybrid. In certain preferred embodiments, the material of the fabric backing layer comprises a material selected from the group consisting of nylon, carbon fiber, polyaramid, carbon fiber and polyaramid hybrid.

In certain embodiments, the tether is a fabric material, for example, selected from synthetic fabrics like polyester, spandex, nylon, carbon fiber, polyaramid, carbon fiber polyaramid hybrid, carbon fiber basalt hybrid, fiberglass, carbon fiber, or fiberglass hybrid, and natural fabrics including cotton, hemp, wool, silk, bamboo string, cellulose, jute, and pina. In certain embodiments, the tether is a non-fabric material, for example, selected from leather, metal sheets, plastic sheets, or non-woven textiles. In some embodiments, the material is made from chain-link meshes.

In certain embodiment, the elastic material can extend beyond the fabric layer on the "back side" of the pad. This design may aid the establishment of uniform contact without sacrificing the stiffness of the device that is directly related to the force capacity of the adhesive device.

In certain embodiments, the adjustable angle between the tether and the adhesive pad range from about 0° to about 90°, for example, 15°, 30°, 45°, or 60°. In certain other embodiments, the adjustable angle between the tether and the adhesive pad range from about 90° to about 120°, for example, 95°, 110°, 110°, or 115°. In certain other embodiments, the adjustable angle between the tether and the adhesive pad range from about 120° to about 360°, for example, 150°, 180°, 210°, 270° or 300°.

In certain embodiments, the ratio of storage to loss elastic moduli is at least greater than about 10 (e.g., greater than 15, 20, or 50) at the operating temperature of interest.

The layer of the elastic material may have any size and shape as a particular application requires, for example, it may have a substantially circular outer boundary, a substantially rectangular outer boundary, a substantially elliptical outer boundary, or a substantially irregular outer boundary.

As stated herein, in some embodiments, the layer of an elastic material includes two, three, four or more separate smaller elastic material layer units or structures. The target surface may be any suitable surfaces, including that of glass, metal, wood, plastic, paper, cardboard, or concrete. The two or more adhesive pads may be configured such that they are capable of adhering to target surfaces at arbitrary angles to one another. In some embodiments, the two or more adhesive pads are configured such that they face the same direction. In some embodiments, the two or more adhesive pads are configured such that they face different directions.

Another application that may benefit from the disclosed invention is to connect two (or more) objects with the adhesive device of the invention. For example, a double-sided adhesive device may be used as a connector to connect two heavy objects, each of which has a properly positioned flat surface to apply the adhesive pad to. Thus, the invention also relates to a method for using the double-sided adhesive device disclosed herein to connect two objects with flat surfaces. Once connected, the two or more objects can be moved vertically or horizontally according to the applications.

The integrated adhesive pad approach of the invention provides a robust platform for a wide-variety of applications. For example, these structures can be used to support shelving for books, displays, and electronic appliances (televisions, computers, stereos, monitors, screens); hanging structures; auto trims; among others.

EXAMPLES

Force vs. Displacement Tests

Figure 13:
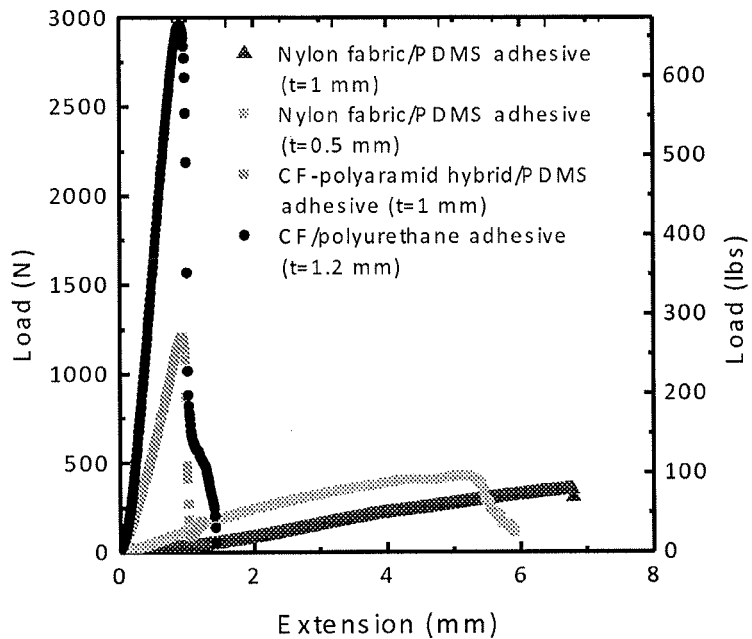
FIG. 13 shows exemplary force vs. displacement measurements for characterizing maximum force supported under pure shear loading for "T-pad" structures.

FIG. 13 shows exemplary force vs. displacement measurements for characterizing maximum force supported under pure shear loading for T-pad structures. (Fabric backing varied. All results were for 16 in2 pad with varying thicknesses labeled as 't' in the legend.) The experiments were run on an Instron testing machine in a single lab joint geometry where attachment was made between the adhesive pad and a smooth clean glass substrate. The extension was controlled to be 10 mm/min and the load was measured throughout the test. The maximum load corresponds to the critical failure load, which varies depending on fabric backing as shown.

Figure 14:
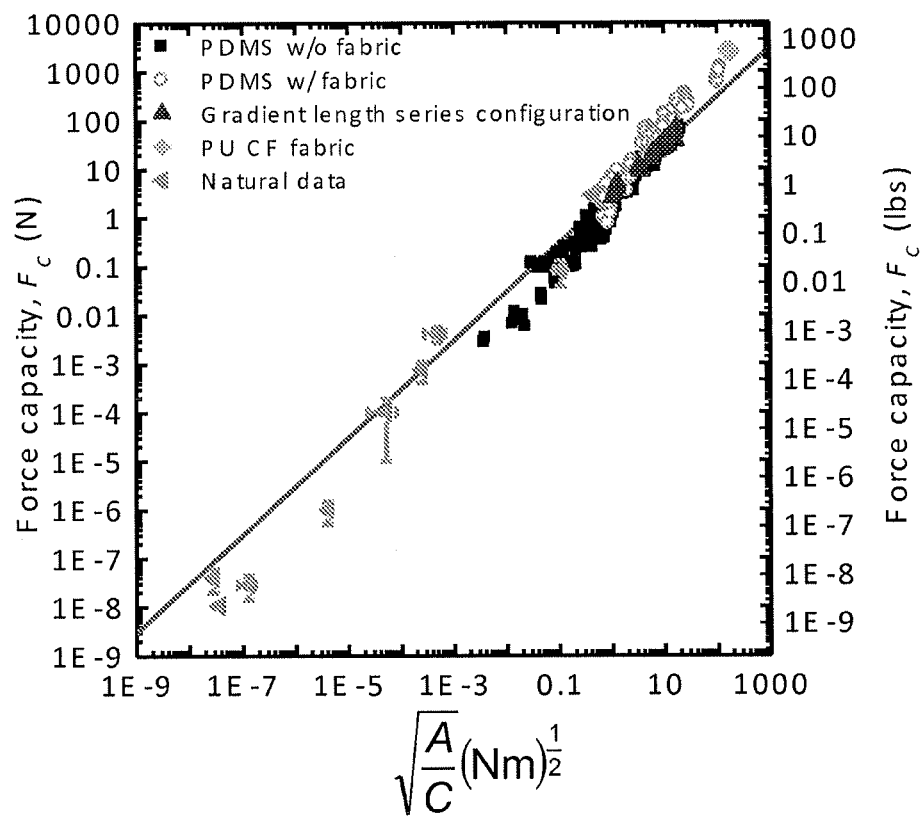
FIG. 14 shows exemplary maximum shear force supported for various "T-pad" configurations, live geckos, and non-fabric backed polymer coatings as a function of the square root of interfacial area normalized by in-plane compliance.

FIG. 14 shows maximum shear force supported for various T-pad configurations, natural data (which includes live geckos and various attachment devices for geckos, beetles, spiders, crickets, and flys), and non-fabric backed polymer coatings as a function of the square root of interfacial area normalized by in-plane compliance. Trend line follows predicted scaling relationship demonstrating ability to predictably tune maximum shear force performance.

Failure Force Tests

Figure 15:
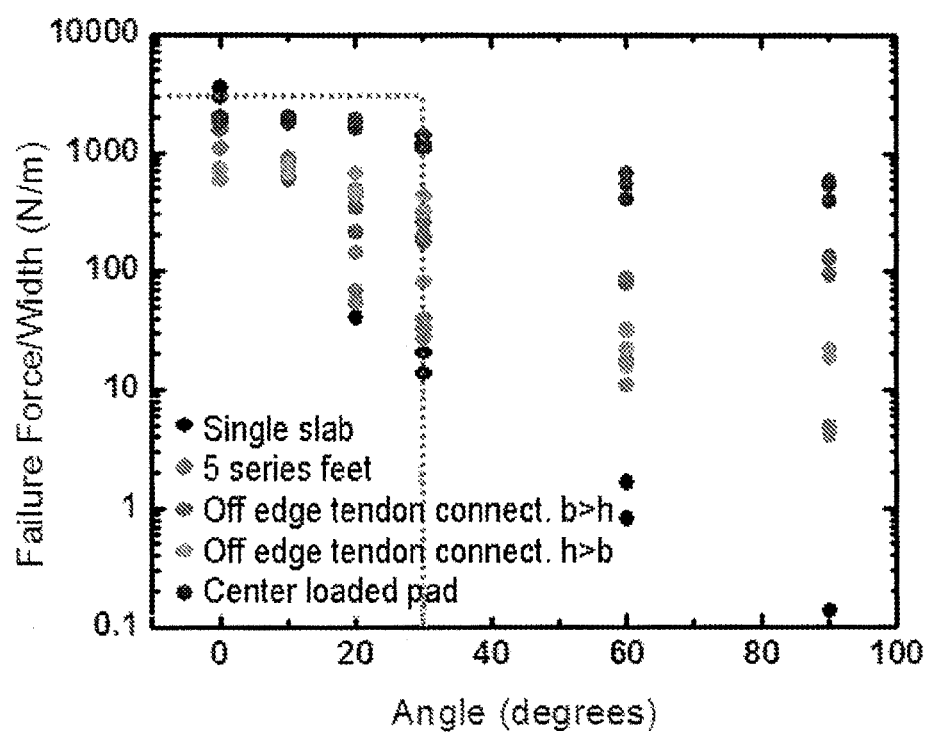
FIG. 15 shows exemplary failure force per unit width as a function of peel angle for various "T-pad" configurations.

FIG. 15 shows failure force per unit width as a function of peel angle for different Tpad configurations (total contact area for each adhesive pad is 10.8 cm$^2$, and the center loaded pad connection is ⅔ the width). Demonstrating ability to tune critical angle for easy release. Peel experiments were conducted on an Instron 5500 R on clean glass at 10 mm/min, and the angle between the applied load and substrate was varied between 0° and 90°.

Figure 16:
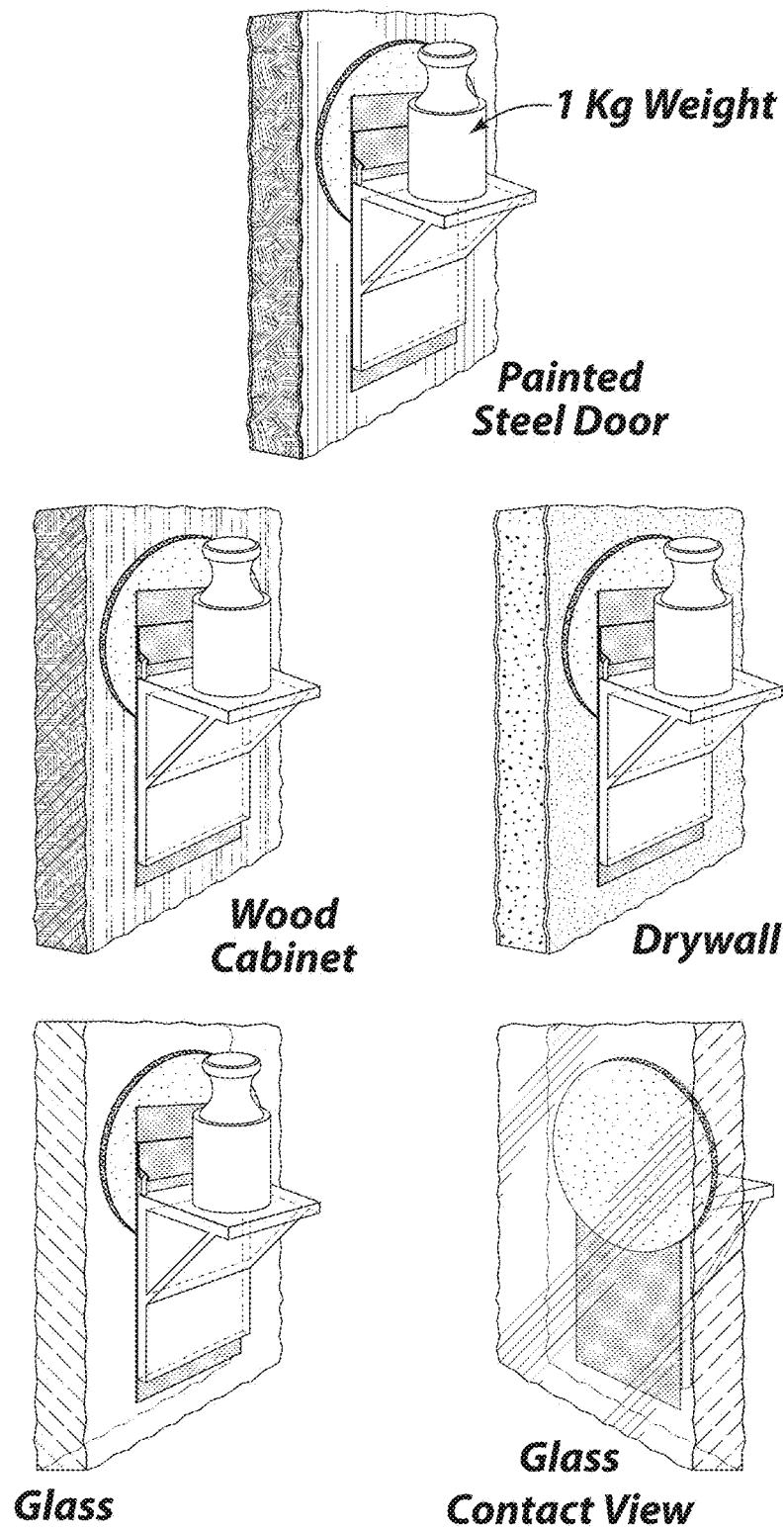
FIG. 16 shows certain examples of complete "T-Pad" structures supporting loads on various surfaces.

FIG. 16 shows some simple examples of complete T-Pad structure to support loads on various surfaces. The same nylon fabric PDMS adhesive (A=16 in$^2$ with thickness of 1 mm) pad structure is used in all examples.

Polyurethane Adhesives

Polyurethane adhesives have been synthesized by adding 1:1 ratio of functional groups of hydroxyl ended polyethylene glycol, polypropylene glycol, and/or polytetramethylene glycol, with either aliphatic or aromatic based polyisocyanates. Commercial kits of polyurethanes have also been utilized in this application.

Figure 17:
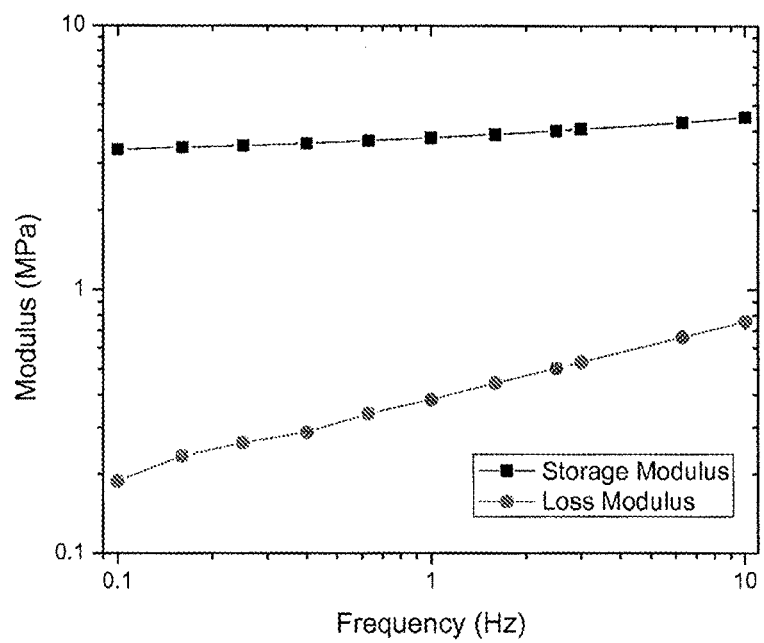
FIG. 17 shows exemplary plot of modulus against frequency for an example of polyurethane.

FIG. 17 shows modulus is plotted against frequency for an example of polyurethane. The storage modulus is about an order of magnitude greater than the loss modulus, showing that the sample has predominantly solid-like, elastic properties. The modulus also varies little over two orders of magnitude in frequency.

Loading Tests

Figure 18:
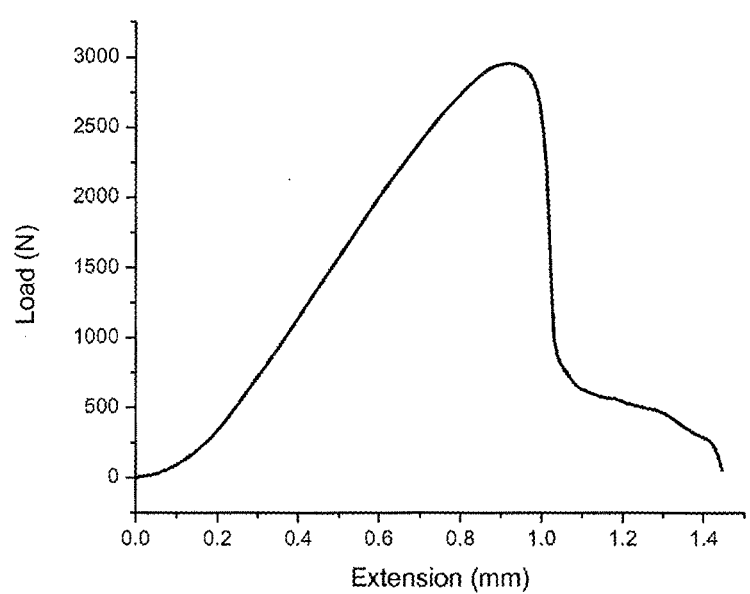
FIG. 18 shows exemplary results of a controlled displacement test (load plotted against extension).
Figure 19:
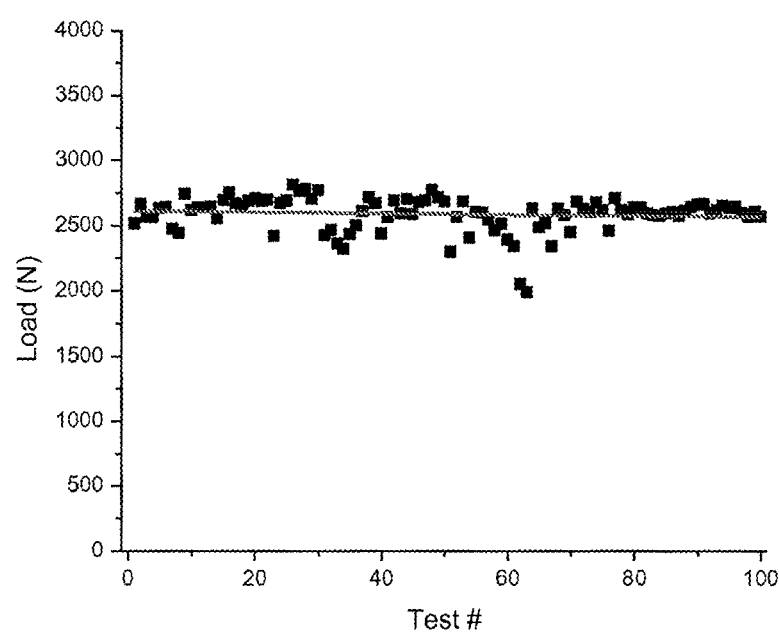
FIG. 19 shows exemplary results of the repeatability of a polyurethane adhesive pad undergoing cyclic loading.

Sample adhesive pads were tested using an Instron controlled displacement test. Mechanical grips were attached to an Instron 5500 R, with a pane of glass attached to the grip on the crosshead, and the adhesive pad secured to the bottom grip. The adhesive pad was then adhered to the glass, and a displacement of 10 mm/min was used until the adhesive detached from the glass. This test was repeated multiple times to determine the average failure force, and prove reusability. FIG. 18 shows that there is an initial loading regime, and by finding the slope of this line one can find the stiffness of the adhesive system that controls the total capacity of the adhesive. The stiffness (and therefore, total capacity) for these polyurethane adhesives is greater than previously recorded values of stiffness. At the peak of this curve is the total capacity (~2950 N for this sample). After this peak the adhesive releases from the glass, resulting in a drop in the registered load. This test can be repeated, and we have shown good reproducibility over 100 cycles of testing (FIG. 19).

Figure 20:
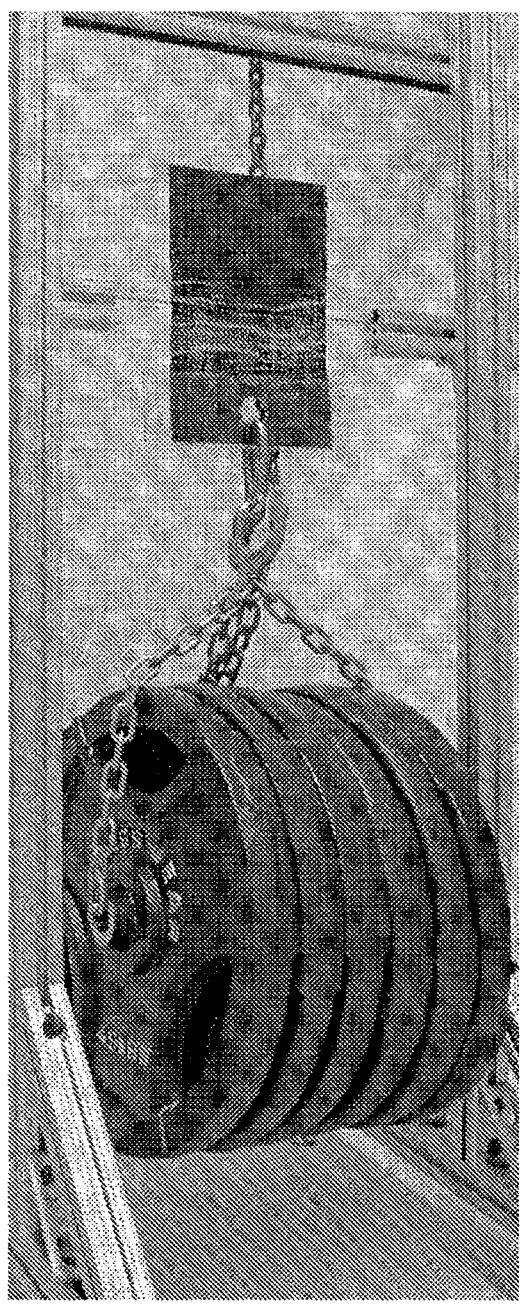
FIG. 20 shows static load test performed with polyurethane adhesives holding 136 kg.

Static load testing was also performed on these polyurethane adhesives. A bar containing 136 kg of mass was connected via chain to an adhesive pad, and was also supported by a pulley system. Using the pulley system, the weights were raised until the adhesive could be adhered to the glass adherend setup. The pulley system was then lowered until the total load was supported by the adhesive. Certain results of such tests are shown in FIG. 20, wherein the tests were performed by holding 136 kg on glass surfaces.

Figure 21:
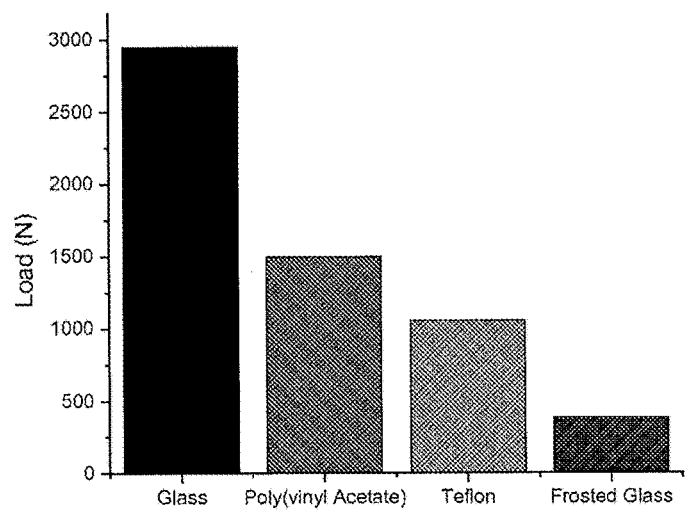
FIG. 21 shows exemplary load data from polyurethane adhesives with a variety of substrates.
Figure 22A:
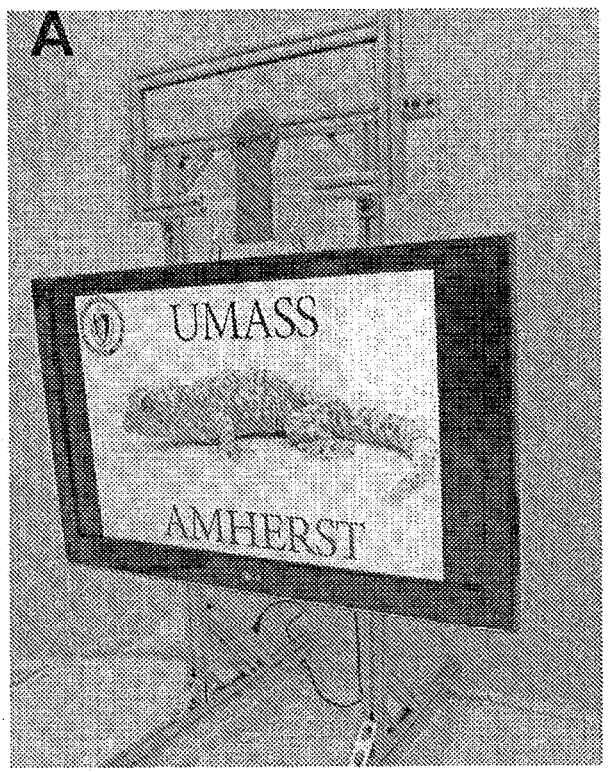
FIG. 22A shows the static load test performed on a center loaded PDMS adhesive pad holding a 42" flat panel television.
Figure 22B:
FIG. 22B shows a center loaded polyurethane adhesive pad holding a hooded sweatshirt on drywall.

As shown in FIG. 21, these polyurethane adhesives can be used on a variety of substrates. These results were performed similarly to previous loading tests, however, the glass pane was either replaced with a new material, or a new material was adhered to the surface of a glass pane. FIGS. 22A-22B show the static load test performed on (A) a 16 in 2 center loaded PDMS adhesive pad holding a 42" flat panel television and (B) a center loaded polyurethane adhesive pad holding a hooded sweatshirt on drywall. FIG. 23A shows schematic illustrations of the loading angle dependence for the high capacity and easy release adhesive pads. FIG. 23B shows results of the angle dependence of the center loaded pad compared to a single slab adhesive pad, where the center loaded pad maintains a high failure force throughout various loading angles, while still allowing for easy release.

Double-Sided Adhesive Structure

Figure 24A:
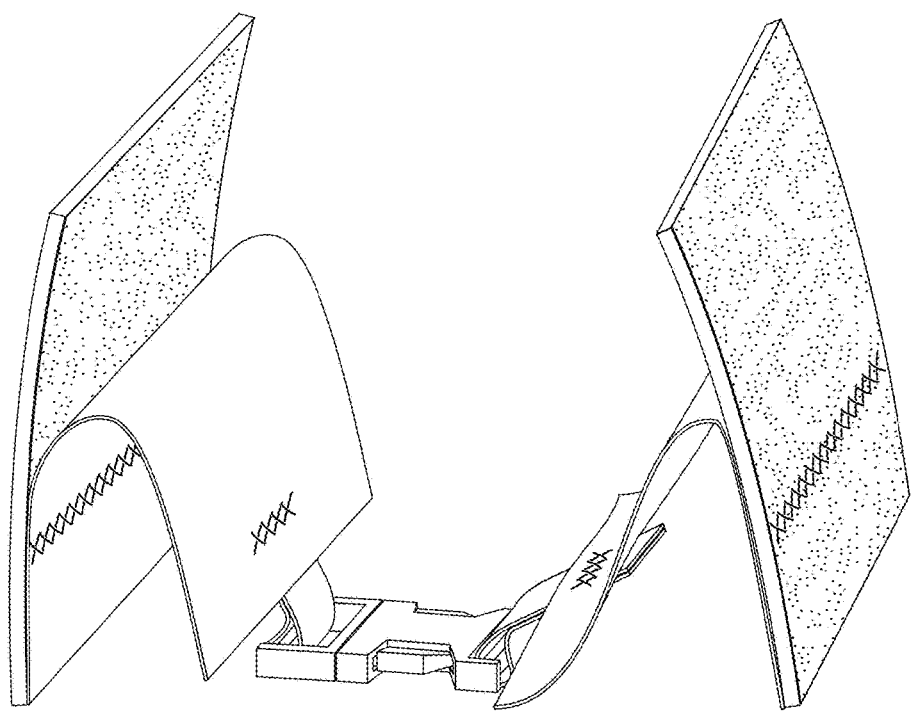
FIGS. 24A-24F show an exemplary image of an embodiment of the invention.
Figure 24B:
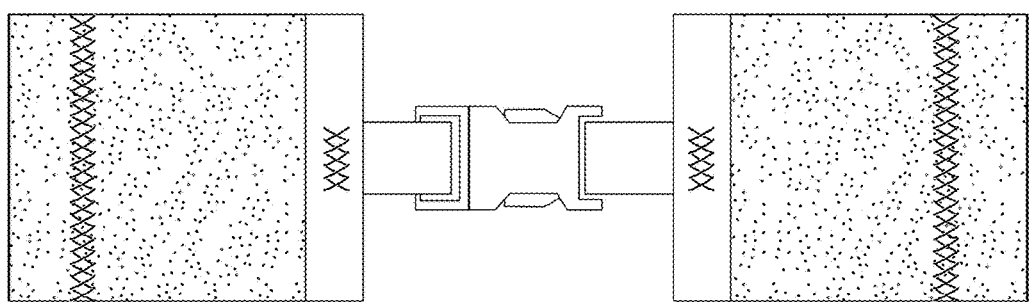
Figure 24C:
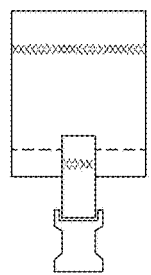
Figure 24D:
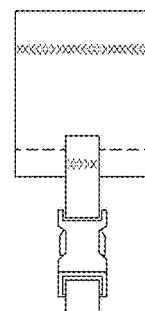
Figure 24D:
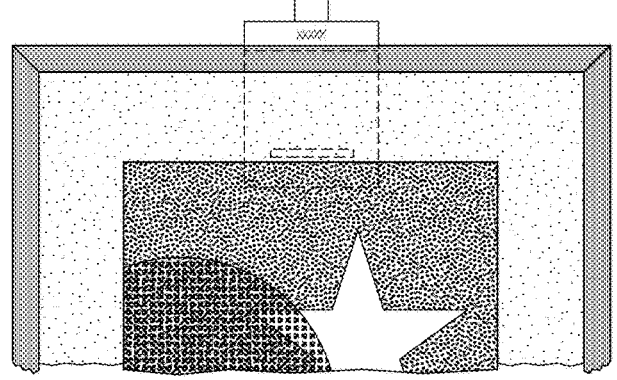
Figure 24E:
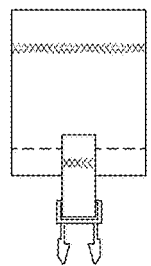
Figure 24F:
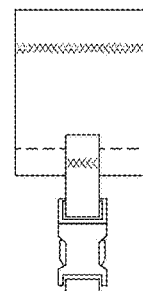
Figure 24F:
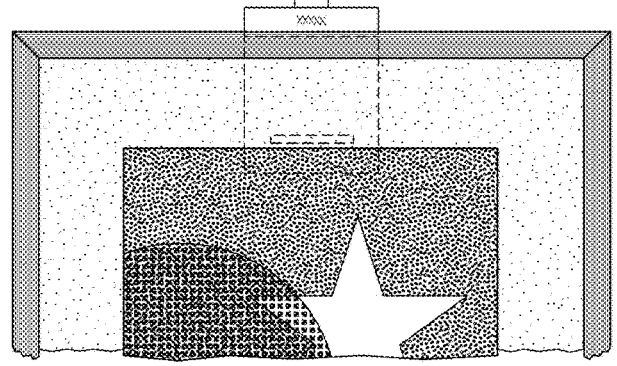

A picture of an example of a double-sided adhesive device is shown in FIGS. 24A-24F. FIG. 24A is a side view of a double sided adhesive pad. FIG. 24B provides a top down view of a double sided adhesive pad showing the adhesive surface. FIGS. 24C-24F demonstrate the load bearing, reusability, and easy release of a double sided adhesive pad on real surfaces (the surface in FIGS. 24C and 24D is a painted door and FIGS. 24E and 24F is a vertical wall of painted drywall). In FIG. 24C one adhesive pad is attached to the target surface (in this case a painted door) while the other adhesive pad is attached to a picture, in FIG. 24D the two pads are connected with the clasp and the picture is hung. FIGS. 24E and 24F demonstrate the same process but the target substrate is painted drywall. In the design of the unit cell, the geometry and materials of the two adhesive pads can be the same or different.

The maximum sustainable force for each adhesive pad will be controlled by the following equation:

$$F_c \propto \sqrt{G_c}\sqrt{\frac{A}{C}},$$

where $G_c$ is defined by the materials chemistry comprising the interface, A is the interfacial area related to the lateral dimensions of the adhesive pads, and C is the stiffness of the adhesive pad in the direction of loading. Hence, the adhesive pads can be designed with appropriate dimensions and/or materials such that one interface formed with one adhesive pad area will de bond prior to the other pad. The length of the tendon can be altered to control the relative positioning of materials that are bonded using the double sided adhesive pad, but the tendon materials and length must be long enough to permit sufficient rotation without developing a significant torque or moment on the adhesive pad structures during use. The inplane stiffness of the skin and tendon can be used to control the maximum sustainable force for double-sided bonding applications.

Figure 25:
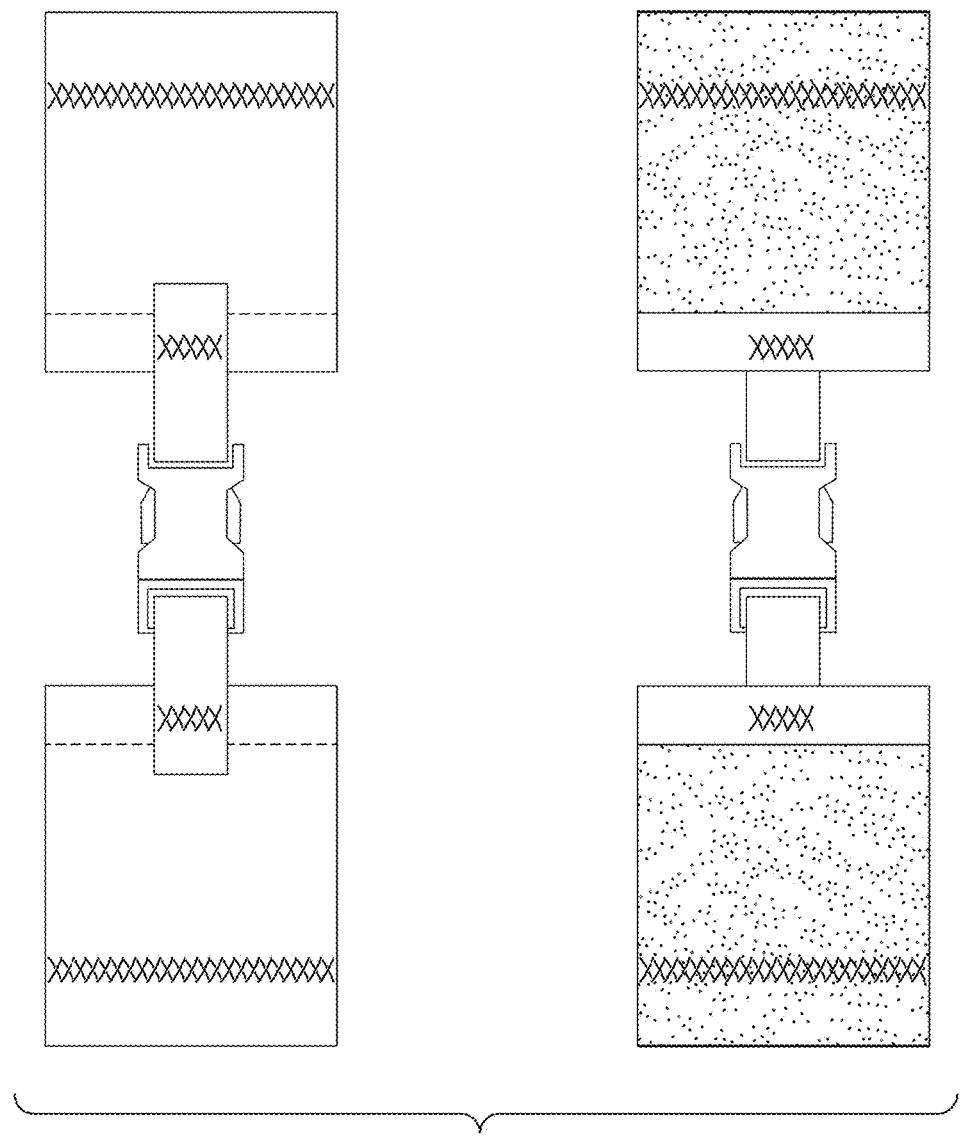
FIG. 25 shows an exemplary image of an embodiment of the invention.

The unit cell design for a double-sided adhesive pad structure described above can be a separate system or integrated into an extensive surface of unit cells to create a double-sided adhesive pad array. Each unit cell can have the same or different attributes. Furthermore, the tendon connecting the pads can either be a continuous flexible material, or combinations of rigid and flexible materials, including combinations with fabric and other fasteners, such as shown for example in FIG. 25.

Fabrication of PDMS Adhesive Pads

Figure 26A:
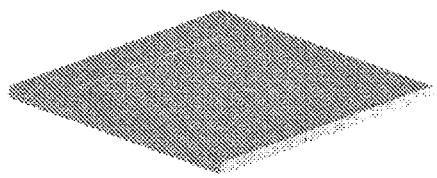
FIGS. 26A-26F illustrate an exemplary embodiment of fabricating an adhesive pad according to the invention.
Figure 26B:
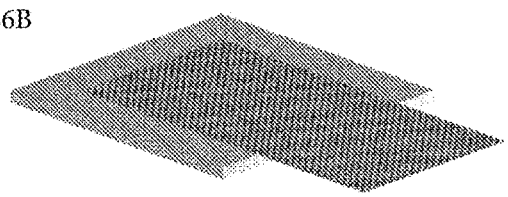

FIGS. 26A-26E schematically illustrate an embodiment of fabrication of PDMS adhesive pads. FIG. 26A, to prepare PDMS adhesives, molds were fabricated using glass slides. Uncured, degassed PDMS oligomer and curing agent (Dow Corning Sylgard 184™) 10:1 ratio (w/w) were poured into the mold. The mold was constructed such that its thickness was greater than the roughness of the fabric, which allowed for a smooth surface finish on the adhesive after fabrication. After the degassed PDMS was poured and allowed to spread into the mold, a 6-8 minute pre-cure at 70° C. was performed before the application of the fabric to help support the fabric during the subsequent cure. FIG. 26B, fabric was then placed over the mold allowing the uncured PDMS to impregnate the fabric, and was then cured at room temperature for 3 days. The fabric consisted of a single piece that was cut so that the width overlaps the edges of the mold to provide support, and the length was sufficiently long to cover the mold and create the "tendon" structure. The tendon can also be impregnated with elastomer to provide for equal load sharing.

Figure 26C:
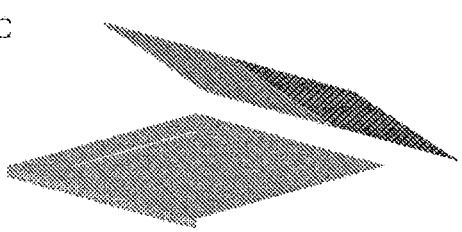
Figure 26D:
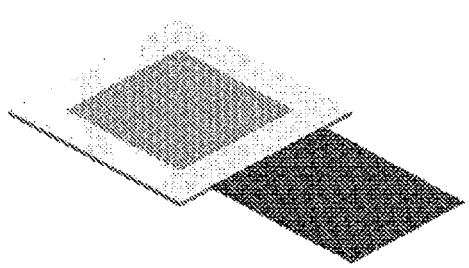
Figure 26E:
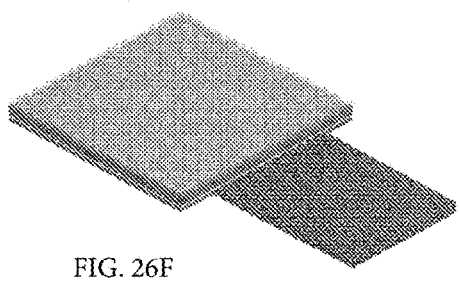

In another embodiment, the fabric was designed to be a center loaded pad, such that a fabric tendon was stitched to the center of the adhesive pad fabric. In this scheme, the tendon structure was also impregnated with PDMS to ensure that the fabric did not unravel during subsequent load application. This was achieved by placing one separator sheet between the tendon and the adhesive pad, then spreading PDMS across the tendon, followed by placing a capping separator sheet on top of the impregnated tendon. FIG. 26C-26E, after the PDMS was cured, the fabric adhesive was removed from the mold and mechanically cut to size.

Fabrication of PU Adhesive Pads

Figure 26F:
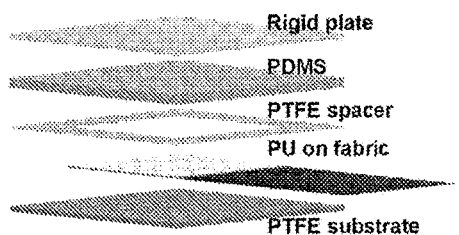

FIG. 26F schematically illustrates an embodiment of the molding technique by which to form a pad with polyurethane. On top of a polytetrafluoroethylene substrate fiber was placed for the adhesive backing layer. A polytetrafluoroethylene (PTFE) spacer was placed on top of the fiber that allows for controlling polyurethane (PU) thickness, and uncured PU prepolymer was poured into the mold. A polydimethylsiloxane pad was then placed on top with a glass plate, and finally the system was weighted with a 20.5 kg weight.

Utilizing this molding technique, a smooth adhesive surface (utilizing a smooth PDMS top layer), or surface features (utilizing a patterned PDMS top layer) can be achieved. The thickness of the adhesive can be changed by modifying the thickness of the PTFE spacer. This method may also be altered to work using a doctor blade system, which would allow for mass production of adhesive pads.

Fabrication of Double Sided Adhesive Pads

The double sided adhesive pad is then fabricated by fixing the tendon structure of one adhesive pad to another. The connection between the two or more adhesive pads can vary in length as well as orientation to suit the particular application. The tendons can also be fixed by multiple means, including permanent (i.e., stitching) as well as temporary methods (i.e. reversible clasps).

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A releasable surface-adhesive device comprising:
   an adhesive pad comprising:
      a planar backing layer; and
      an elastic planar layer including an adhesive surface, wherein the elastic planar layer is applied to the backing layer on a side opposing the adhesive surface; and
   a tether attached to and extending from a portion of the adhesive pad, wherein the tether, the planar backing layer, and the elastic planar layer form a continuous planar component.

2. The releasable surface-adhesive device of claim 1, wherein the backing layer has a higher in-plane stiffness than the elastic planar layer.

3. The releasable surface-adhesive device of claim 1, wherein the portion of the adhesive pad that the tether is attached to is located away from a center of the adhesive pad.

4. The releasable surface-adhesive device of claim 3, wherein the portion of the adhesive pad that the tether is attached to is located away from an edge of the adhesive pad.

5. The releasable surface-adhesive device of claim 1, wherein the tether is attached to the planar backing layer of the adhesive pad.

6. The releasable surface-adhesive device of claim 1, wherein the tether and backing layer are formed by a single continuous piece of material.

7. The releasable surface-adhesive device of claim 1, wherein a portion of the backing layer extends beyond the elastic planar layer.

8. The releasable surface-adhesive device of claim 1, wherein the backing layer is a fabric backing layer including at least one of cotton, hemp, wool, silk, bamboo string, cellulose, jute, and pina, polyester, spandex, nylon, carbon fiber, polyaramid, carbon fiber polyaramid hybrid, carbon fiber basalt hybrid, fiberglass, carbon fiber, and fiberglass hybrid.

9. A releasable surface-adhesive device comprising:
a first adhesive pad and a second adhesive pad, wherein each adhesive pad comprises:
an elastic planar layer including an adhesive surface; and
a tether attached to and extending between the first adhesive pad and the second adhesive pad, wherein the tether and the elastic planar layer of at least one of the adhesive pads form a continuous planar component.

10. The releasable surface-adhesive device of claim 9, wherein the tether and the elastic planar layer of both adhesive pads form a continuous planar component.

11. The releasable surface-adhesive device of claim 9, wherein each adhesive pad further comprises a planar backing layer, wherein the elastic planar layer is applied to the backing layer on a side opposing the adhesive surface, and wherein the tether, backing layer, and the elastic planar layer of each adhesive pad form the continuous planar component.

12. The releasable surface-adhesive device of claim 11, wherein the tether and the backing layer of at least one of the adhesive pads are formed by a single continuous piece of material.

13. The releasable surface-adhesive device of claim 11, wherein for each adhesive pad the backing layer has a higher in-plane stiffness than the associated elastic planar layer.

14. The releasable surface-adhesive device of claim 11, wherein the tether is attached to the planar backing layer of the first adhesive pad and the planar backing layer of the second adhesive pad.

15. The releasable surface-adhesive device of claim 11, wherein for at least one of the first adhesive pad and the second adhesive pad a portion of the backing layer extends beyond the elastic planar layer.

16. The releasable surface-adhesive device of claim 11, wherein each backing layer of at least one of the first adhesive pad and the second adhesive pad is a fabric backing layer including at least one of cotton, hemp, wool, silk, bamboo string, cellulose, jute, and pina, polyester, spandex, nylon, carbon fiber, polyaramid, carbon fiber polyaramid hybrid, carbon fiber basalt hybrid, fiberglass, carbon fiber, and fiberglass hybrid.

17. The releasable surface-adhesive device of claim 9, wherein the first adhesive pad and the second adhesive pad are attached to opposing sides of the tether.

18. The releasable surface-adhesive device of claim 9, wherein the first adhesive pad and the second adhesive pad are attached to a same side of the tether.

19. A releasable surface-adhesive device comprising:
a first adhesive pad and a second adhesive pad, wherein each adhesive pad comprises:
a planar backing layer;
an elastic planar layer including an adhesive surface, wherein the elastic planar layer is applied to the backing layer on a side opposing the adhesive surface; and
a tether attached to and extending between the first adhesive pad and the second adhesive pad.

20. The releasable surface-adhesive device of claim 19, wherein for each adhesive pad the backing layer has a higher in-plane stiffness than the associated elastic planar layer.

21. The releasable surface-adhesive device of claim 19, wherein the tether is attached away from a center of at least one of the first adhesive pad and the second adhesive pad.

22. The releasable surface-adhesive device of claim 21, wherein the tether is attached away from an edge of at least one of the first adhesive pad and the second adhesive pad.

23. The releasable surface-adhesive device of claim 22, wherein the tether is attached away from both the edge and the center of both the first adhesive pad and the second adhesive pad.

24. The releasable surface-adhesive device of claim 21, wherein the tether is attached substantially at a center of at least one of the first adhesive pad and the second adhesive pad.

25. The releasable surface-adhesive device of claim 19, wherein the tether is attached to the planar backing layer of the first adhesive pad and the planar backing layer of the second adhesive pad.

26. The releasable surface-adhesive device of claim 19, wherein for at least one of the first adhesive pad and the second adhesive pad a portion of the backing layer extends beyond the elastic planar layer.

27. The releasable surface-adhesive device of claim 19, wherein each backing layer of at least one of the first adhesive pad and the second adhesive pad is a fabric backing layer including at least one of cotton, hemp, wool, silk, bamboo string, cellulose, jute, and pina, polyester, spandex, nylon, carbon fiber, polyaramid, carbon fiber polyaramid hybrid, carbon fiber basalt hybrid, fiberglass, carbon fiber, and fiberglass hybrid.

* * * * *